US011603779B2

(12) United States Patent
Saga et al.

(10) Patent No.: US 11,603,779 B2
(45) Date of Patent: Mar. 14, 2023

(54) OIL PUMP AND CONTROL VALVE

(71) Applicant: HITACHI ASTEMO, LTD., Hitachinaka (JP)

(72) Inventors: Koji Saga, Ebina (JP); Tadao Nakamura, Guangdong Province (CN)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/282,507

(22) PCT Filed: Sep. 10, 2019

(86) PCT No.: PCT/JP2019/035453
§ 371 (c)(1),
(2) Date: Apr. 2, 2021

(87) PCT Pub. No.: WO2020/071061
PCT Pub. Date: Apr. 9, 2020

(65) Prior Publication Data

US 2021/0381405 A1 Dec. 9, 2021

(30) Foreign Application Priority Data

Oct. 4, 2018 (JP) ............................ JP2018-188722

(51) Int. Cl.
*F01M 1/16* (2006.01)
*F01M 1/02* (2006.01)

(52) U.S. Cl.
CPC ................ *F01M 1/16* (2013.01); *F01M 1/02* (2013.01)

(58) Field of Classification Search
CPC .... F01M 1/16; F01M 1/02; F01M 2001/0238; F01M 2001/0246; F16N 13/20; F04C 15/06

(Continued)

(56) References Cited

U.S. PATENT DOCUMENTS

2010/0226799 A1 9/2010 Watanabe et al.
2015/0377096 A1* 12/2015 Kishi ...................... F01M 1/20 137/625.18

(Continued)

FOREIGN PATENT DOCUMENTS

JP 2010-209718 A 9/2010
JP 2016-142220 A 8/2016

(Continued)

OTHER PUBLICATIONS

International Search Report dated Nov. 26, 2019 issued in International Application No. PCT/JP2019/035453, with English translation, 2 pages.

(Continued)

*Primary Examiner* — Yi-Kai Wang
(74) *Attorney, Agent, or Firm* — Foley & Lardner LLP

(57) ABSTRACT

An oil pump includes a pump component, a valve container, a valve mechanism, and a circumvention passage. The valve container includes a through hole establishing communication between an inside and an outside of the valve container. The valve mechanism includes: a valve body contained in the valve container; a valve element contained movably in the valve body; a back pressure chamber disposed to face a first valve end of the valve element; a drive mechanism disposed to face a second valve end of the valve element and structured to generate a drive force to move the valve element; and an aperture positioned higher in a vertical direction than the through hole and formed in the valve body so as to establish communication between the back pressure chamber and the inside of the valve container. The circumvention passage establishes communication between the through hole and the aperture.

18 Claims, 14 Drawing Sheets

(58) Field of Classification Search
USPC .......................................................... 123/196 R
See application file for complete search history.

(56) References Cited

U.S. PATENT DOCUMENTS

| | | | | |
|---|---|---|---|---|
| 2016/0177949 | A1* | 6/2016 | Kido | F04C 2/3441 418/22 |
| 2018/0100517 | A1 | 4/2018 | Sawada et al. | |
| 2019/0017596 | A1* | 1/2019 | Senbongi | F04C 14/226 |

FOREIGN PATENT DOCUMENTS

| | | | |
|---|---|---|---|
| JP | 2016-211523 | A | 12/2016 |
| JP | 2018-105308 | A | 7/2018 |

OTHER PUBLICATIONS

Written Opinion dated Nov. 26, 2019 issued in International Application No. PCT/JP2019/035453, with English translation, 13 pages.

* cited by examiner

2
OIL
7
39
3
1
4
3
5
8
9
6

MAIN OIL GALLERY
52
87
51
50
49
31a
31d
31b
35
31
32
46
8
47
49
9
6
10b
13c
11a
2
14
13b
4b
23
18
16
19
13e
10
26
24
4
13
25
22
12
11c
15
11a
11b

OIL PUMP AND CONTROL VALVE

CROSS-REFERENCE TO RELATED APPLICATIONS

The present application is a 371 of PCT/JP2019/035453 filed Sep. 10, 2019, which is based upon and claims priority to Japanese patent application 2018-188722 filed on Oct. 4, 2018, both of which are incorporated herein by reference in their entireties.

TECHNICAL FIELD

The present invention relates to an oil pump and a control valve.

BACKGROUND ART

Patent Document 1 cited below discloses an oil pump structured to vary in control oil pressure with use of an electromagnetic valve.

According to the oil pump in Patent Document 1, the electromagnetic valve includes a valve body having a shape of bottomed cylinder containing a spool movably. The bottom of the valve body includes a through hole that extending in a direction of movement of the spool and opening to the atmosphere.

PRIOR ART DOCUMENT(S)

Patent Document(s)

Patent Document 1: JP 2010-209718 A

SUMMARY OF THE INVENTION

Problem(s) to be Solved by the Invention

In case of disposing the electromagnetic valve of Patent Document 1 in an oil pan, the electromagnetic valve may undergo a malfunction due to intrusion of oil containing a contaminant into an inside of the valve body via the through hole.

In view of the foregoing circumstances, it is desirable to provide an oil pump or a control valve which allows a valve mechanism to operate with stability.

Means for Solving the Problem(s)

According to one aspect of the present invention, a valve body includes an aperture that is positioned higher in a vertical direction than a through hole of a valve container and is in communication with the through hole via a circumvention passage.

According to another aspect of the present invention, a valve body includes an aperture that is positioned to avoid directly facing a through hole of a valve container, and is in communication with the through hole via a circumvention passage.

Effect(s) of the Invention

The present invention serves for stable operation of a valve mechanism.

MODE(S) FOR CARRYING OUT THE INVENTION

With reference to the drawings, the following describes embodiments each of which shows a variable displacement pump serving as an oil pump according to the present invention.

Figure 1:
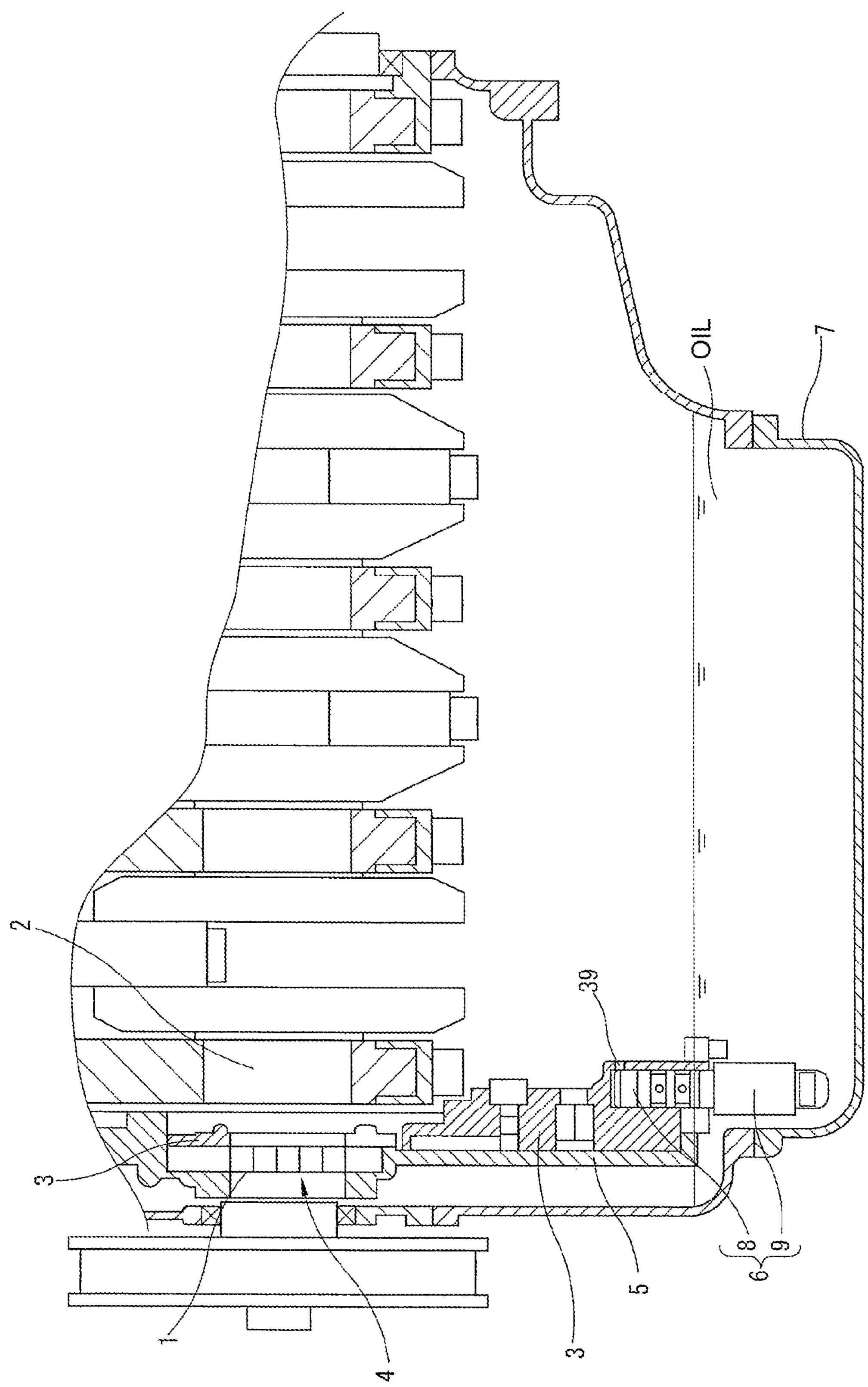
FIG. 1 is a longitudinal sectional view of a variable displacement pump etc. according to a first embodiment.

[First Embodiment] FIG. 1 is a longitudinal sectional view of a variable displacement pump serving as an oil pump according to a first embodiment.

The variable displacement pump is structured to supply lubricating oil: i.e., oil used for lubrication in sliding parts in an internal combustion engine and/or for driving of a valve timing control device of the internal combustion engine. The variable displacement pump is operated by driving a pump component 1 with use of a crankshaft 2, wherein pump component 1 includes a rotor 11 etc. described below. Pump component 1 is contained in a pump container 4 formed in an oil pump cover 3. Oil pump cover 3 contains a timing chain not shown, and is closed by a front cover 5. Thus, oil pump cover 3 and front cover 5 form a housing that contains pump component 1. Oil pump cover 3 also serves as a base to which an electromagnetic valve 6 is mounted. Electromagnetic valve 6 is a valve mechanism structured to vary a control oil pressure of the variable displacement pump, and includes a valve part 8 and a solenoid part 9. Valve part 8 serves for supply and discharge of oil depending on an axial position of a spool valve 32, i.e. a valve element described below, in a direction of movement of spool valve 32. Solenoid part 9 serves as a drive mechanism structured to control the axial position of spool valve 32 in response to energization. Electromagnetic valve 6 is positioned closely to pump component 1 when viewed in an axial direction of crankshaft 2, and positioned between crankshaft 2 and a bottom of an oil pan 7 when viewed in a vertical direction. As shown in FIG. 1, electromagnetic valve 6 is disposed in a vertical attitude to extend in the vertical direction, with solenoid part 9 soaked in oil in oil pan 7.

Figure 2:
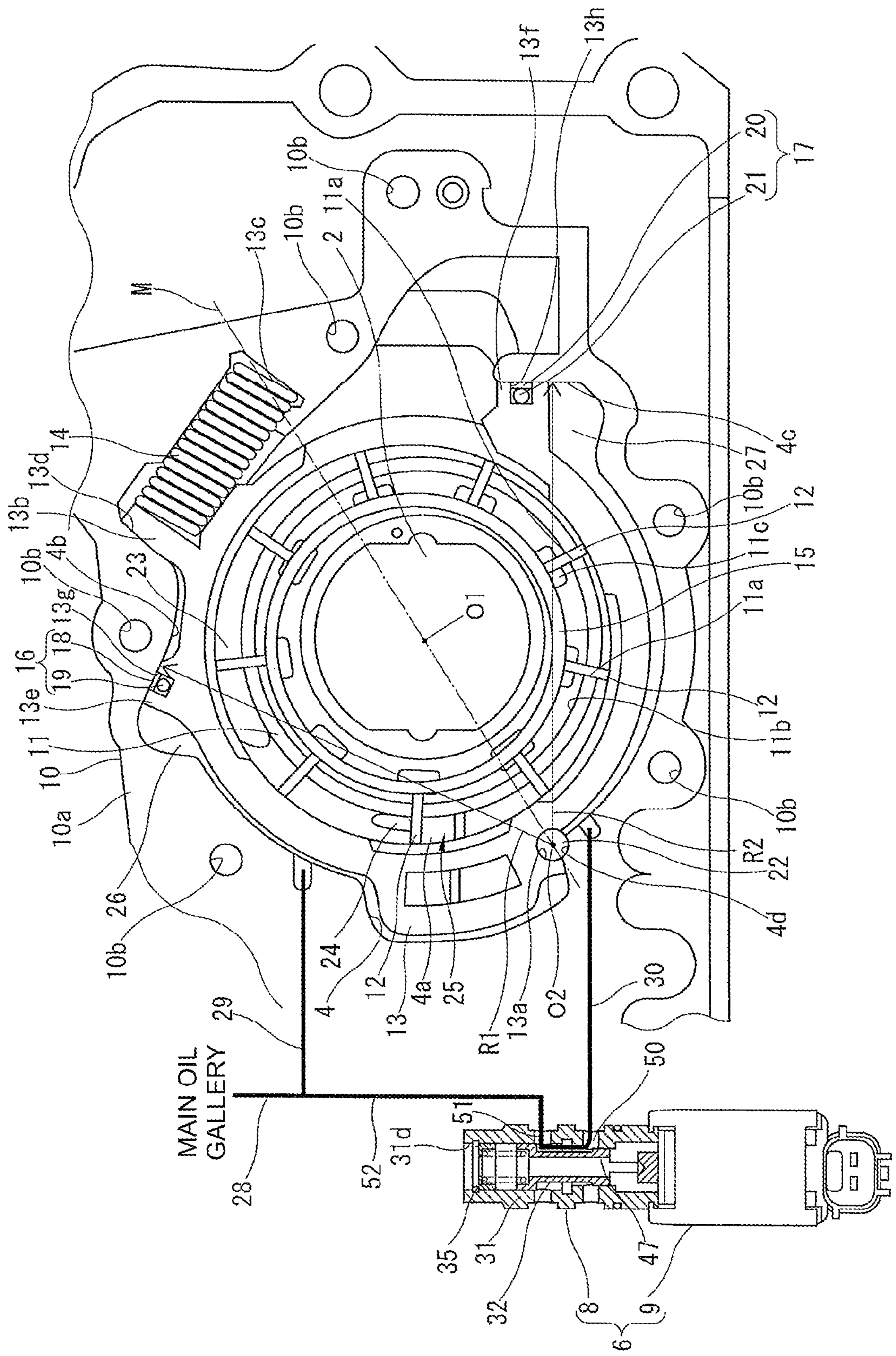
FIG. 2 is a front view of the variable displacement pump with its front cover removed.

(Configurations of Variable Displacement Pump) FIG. 2 is a front view of the variable displacement pump, in which front cover 5 in FIG. 1 is removed.

The variable displacement pump includes the electromagnetic valve 6, a housing body 10, a rotor 11, nine vanes 12, cam ring 13 being a control member, a bias member (e.g. a coil spring 14), a pair of rings 15, 15, a first sealing mean 16, and a second sealing mean 17. FIG. 2 shows only one ring 15 out of the pair of rings 15, 15.

Housing body 10 is made of a metallic material such as an aluminum alloy, and is formed integrally with oil pump cover 3. Housing body 10 has a shape of bottomed cylinder so as to include pump container 4 including an open end and an interior recessed in a substantially columnar shape. Housing body 10 further includes a first bearing hole (not shown) rotatably supporting the crankshaft 2, at a center of a bottom surface 4*a* of pump container 4. Housing body 10 still further includes, around the opening of pump container 4, a mount surface 10*a* that is flat and has a continuous annular shape. Mount surface 10*a* serves as a surface to which front cover 5 not shown (see FIG. 1) is mounted, and includes six screw holes 10*b* into which fixing members such as screws not shown are screwed. Front cover 5 includes six fixing member through holes (not shown) through which the screws pierce. The fixing member through holes are respectively formed at positions corresponding to six screw holes 10*b* of housing body 10. Thus, front cover 5 is mounted and fixed to housing body 10 by screwing the screws into six screw holes 10*b* via the fixing member through holes. Furthermore, front cover 5 includes a second bearing hole (not shown) rotatably supporting the crankshaft 2, at a position corresponding to the first bearing hole of housing body 10.

Rotor 11 has a cylindrical shape, and is rotatably contained in pump container 4. Rotor 11 includes: a central portion connected to crankshaft 2; nine slits 11*a* formed as openings radially extending from an inner central side to an radially outer side of rotor 11; and a pair of circular depressions 11*b* formed as openings in both sides of rotor 11 (FIG. 2 shows only one of the both sides), wherein each of circular depressions 11*b* is depressed in a shape of circle centered at crankshaft 2. Each of circular depressions 11*b* receives a corresponding one of rings 15 slidably disposed therein.

Each of vanes 12 is a thin metallic plate, and is retractably contained in a corresponding one of slits 11*a* of rotor 11. When each of vanes 12 is retracted in the corresponding one of slits 11*a*, the each of vanes 12 and the corresponding one of slits 11*a* form a gap therebetween. Each of vanes 12 includes a tip surface structured to be in sliding contact with an inner peripheral surface of cam ring 13, and includes an inner end surface of a base end section which is structured to be in sliding contact with an outer peripheral surface of ring 15.

Cam ring 13 is made of a sintered metal, and is integrally formed in a cylindrical shape.

Coil spring 14 is contained in housing body 10, and constantly biases cam ring 13 in a direction to increase cam ring 13 in eccentricity from a rotational center of rotor 11.

Each of rings 15 is less in outer diameter than rotor 11, and is slidably disposed in a corresponding one of circular depressions 11*b* of rotor 11.

First sealing mean 16 and second sealing mean 17 are mounted to cam ring 13, so as to separate the cam ring 13 from housing body 10. This defines a first control oil chamber 26 and a second control oil chamber 27 described below, between an outer peripheral surface of cam ring 13 and an inner peripheral surface of housing body 10. First sealing mean 16 includes a first sealing member 18 and a first elastic member 19 biasing the first sealing member 18 toward the inner peripheral surface of housing body 10. Second sealing mean 17 includes a second sealing member 20 and a second elastic member 21 biasing the second sealing member 20 toward the inner peripheral surface of housing body 10.

Pump container 4 includes a support groove 4*d* formed at a predetermined position in an inner peripheral wall of pump container 4. Support groove 4*d* has an arc shape, and swingably supports cam ring 13 via a pivot pin 22 shaped cylindrically.

The following description refers to a straight line passing through a center O1 of the first bearing hole and a center of support groove 4*d* (i.e. a center O2 of pivot pin 22), as a cam ring reference line M, for convenience of explanation.

Pump container 4 includes a first seal contact surface 4*b* formed on the inner peripheral wall of pump container 4, in a region above cam ring reference line M. First seal contact surface 4*b* is in sliding contact with first sealing member 18 formed in the outer periphery of cam ring 13. As shown in FIG. 2, first seal contact surface 4*b* is an arc-shaped surface formed to have a predetermined radius R1 from center O2 of pivot pin 22. First seal contact surface 4*b* has a circumferential length set to allow first sealing member 18 to be constantly in sliding contact with first seal contact surface 4*b*, within a limit of eccentric swing of cam ring 13.

Similarly, pump container 4 includes a second seal contact surface 4*c* formed on the inner peripheral wall of pump container 4, in a region below cam ring reference line M. Second seal contact surface 4*c* is in sliding contact with second sealing member 20 formed in the outer periphery of cam ring 13. As shown in FIG. 2, second seal contact surface 4*c* is an arc-shaped surface formed to have a predetermined radius R2 from center O2 of pivot pin 22, wherein radius R2 is greater than radius R1. Second seal contact surface 4*c* has a circumferential length set to allow second sealing member 20 to be constantly in sliding contact with second seal contact surface 4*c*, within the limit of eccentric swing of cam ring 13.

Bottom surface 4*a* of pump container 4 includes a suction port 23 and a discharge port 24 around crankshaft 2. Suction port 23 is an arc-shaped depression serving as a suction portion. Discharge port 24 is an arc-shaped depression serving as a discharge portion. Suction port 23 and discharge port 24 are formed by cutting, so as to face each other across crankshaft 2. In bottom surface 4*a*, suction port 23 is positioned farther from pivot pin 22, while discharge port 24 is positioned nearer to pivot pin 22. Suction port 23 is open to a suction region, i.e. a region in which pump chambers 25 described below increase in interior volume due to a pumping action of pump component 1. Suction port 23 is provided with an inlet section (not shown) formed integrally with suction port 23 at a circumferentially middle position of suction port 23 such that the inlet section bulges toward a spring housing chamber 13*c* described below. Suction port 23 includes, at a predetermined position therein, a suction hole (not shown) open to the outside through a bottom wall of housing body 10. This causes oil pool in oil pan 7 of the internal combustion engine (not shown) to be sucked into respective pump chambers 25 (described below) in the suction region via the suction hole and suction port 23, due to a negative pressure generated in the pumping action of pump component 1.

Discharge port 24 is open to a discharge region, i.e. a region in which pump chambers 25 decrease in interior volume due to the pumping action of pump component 1. Discharge port 24 includes, at a predetermined position therein, a discharge hole (not shown) open to the outside through the bottom wall of housing body 10. Accordingly, oil pressured due to the pumping action and discharged to discharge port 24 is supplied from the discharge hole to sliding parts, a valve timing device, etc. of the internal combustion engine not shown, via a discharge passage and a main oil gallery not shown.

Cam ring 13 is contained in pump container 4 of housing body 10 so as to be swingable around pivot pin 22. Inside the cam ring 13, rotor 11 connected to crankshaft 2 is disposed. Rotor 11 rotates in a counterclockwise direction in FIG. 2, together with rotation of crankshaft 2.

Rotor 11 includes the nine slits 11*a* formed as the openings radially extending from the inner central side to the radially outer side of rotor 11. Each of slits 11*a* includes, in its inner base end section, a back pressure chamber 11*c* into which discharge oil discharged to discharge port 24 is drawn. Each of back pressure chambers 11*c* is open to circular depression 11*b*. Each of back pressure chambers 11*c* receives oil flowing into it from a second control oil chamber 27 described below via discharge port 24, an oil drawing groove (not shown) formed in bottom surface 4*a* of pump container 4, and circular depression 11*b*. Accordingly, each of vanes 12 retractably contained in a corresponding one of slits 11*a* of rotor 11 is pushed outwardly by a centrifugal force due to rotation of rotor 11 and by an oil pressure in a corresponding one of back pressure chambers 11*c*.

Vanes 12 are structured such that, during the rotation of rotor 11, the tip surface of each vane 12 is in sliding contact with the inner peripheral surface of cam ring 13, and the inner end surface of the base end section of each vane 12 is in sliding contact with the outer peripheral surface of ring 15. This allows vanes 12 to be in sliding contact with the inner peripheral surface of cam ring 13 and thereby liquid-tightly define respective pump chambers 25, even in case that the centrifugal force and the oil pressure of back pressure chambers 11*c* are small due to a low engine speed.

Cam ring 13 includes a pivot part 13*a* at a predetermined position in the outer periphery of cam ring 13. Pivot part 13*a* is a substantially arc-shaped groove formed by cutting so as to extend in the axial direction of crankshaft 2, and supports pivot pin 22 in cooperation with support groove 4*d*. Cam ring 13 further includes an arm 13*b* positioned oppositely to pivot part 13*a* across a center of cam ring 13. Arm 13*b* projects from the outer periphery of cam ring 13 in a radial direction of cam ring 13 to extend in spring housing chamber 13*c*, and is in coordination with coil spring 14 being the bias member on which a predetermined set load W is exerted. Arm 13*b* includes a first side face facing the coil spring 14 and being constantly in contact with a tip of coil spring 14. This establishes the coordination between arm 13*b* and coil spring 14.

Spring housing chamber 13*c* containing the coil spring 14 is disposed in housing body 10, oppositely to pivot pin 22. Inside the spring housing chamber 13*c*, coil spring 14 compressed due to predetermined set load W is in elastic contact with the first side face of arm 13*b* and a first end wall of spring housing chamber 13*c*. Spring housing chamber 13*c* includes a second end wall including a stopper surface 13*d*. Stopper surface 13*d* restricts a movable range in an eccentric direction of cam ring 13. Cam ring 13 is restricted in maximum movement in the eccentric direction, due to contact between stopper surface 13*d* and a second side face of arm 13*b*.

Thus, coil spring 14 constantly biases cam ring 13 in a direction to increase the eccentricity of cam ring 13 (i.e. in the counterclockwise direction in FIG. 2) via arm 13*b*, with an elastic force based on set load W. Accordingly, during a pump inactive period, the second side face of arm 13*b* is maintained pressed onto stopper surface 13*d* of spring housing chamber 13*c* due to a spring force of coil spring 14, and cam ring 13 is retained at a position at which the eccentricity of cam ring 13 from the rotational center of rotor 11 is maximum.

As shown in FIG. 2, cam ring 13 includes a first seal retainer 13*e* and a second seal retainer 13*f* each of which projects from the outer periphery of cam ring 13 and has a substantially rectangular cross section. First seal retainer 13*e* and second seal retainer 13*f* respectively include a first seal surface and a second seal surface, and are positioned to respectively face the first seal contact surface 4*b* and the second seal contact surface 4*c*. First seal retainer 13*e* has a predetermined radius from center O2 of pivot pin 22 which is slightly shorter than radius R1 of first seal contact surface 4*b*. Second seal retainer 13*f* has a predetermined radius from center O2 which is slightly shorter than radius R2 of second seal contact surface 4*c*. The first seal surface and first seal contact surface 4*b* form a slight clearance therebetween, and the second seal surface and second seal contact surface 4*c* form a slight clearance therebetween. Furthermore, first seal retainer 13*e* and second seal retainer 13*f* respectively include, in their respective seal surfaces, a first seal retention groove 13*g* and a second seal retention groove 13*h* each of which extends in an axial direction of cam ring 13 and has a U-shaped cross section. First seal retention groove 13*g* and second seal retention groove 13*h* respectively retain first sealing mean 16 and second sealing mean 17 that respectively contact with first seal contact surface 4*b* and second seal contact surface 4*c* due to the eccentric swing movement of cam ring 13.

First sealing mean 16 includes first sealing member 18 and first elastic member 19. First sealing member 18 is made of a material such as a fluorine-based resin characterized in low friction, and has a shape of slender plate extending in the axial direction. First elastic member 19 is made of a material such as a rubber, and has a shape of slender column extending in the axial direction. First elastic member 19 is interposed between first sealing member 18 and a bottom of first seal retention groove 13*g*, and presses first sealing member 18 onto first seal contact surface 4*b* due to an elastic force of first elastic member 19. This constantly establishes liquid tightness of first control oil chamber 26 described below.

Similarly, second sealing mean 17 includes second sealing member 20 and second elastic member 21. Second sealing member 20 is made of a material such as a fluorine-based resin characterized in low friction, and has a shape of slender plate extending in the axial direction. Second elastic member 21 is made of a material such as a rubber, and has a shape of slender column extending in the axial direction. Second elastic member 21 is interposed between second sealing member 20 and a bottom of second seal retention groove 13*h*, and presses second sealing member 20 onto second seal contact surface 4*c* due to an elastic force of second elastic member 21. This constantly establishes liquid tightness of second control oil chamber 27 described below.

The pair of first and second control oil chambers 26 and 27 are defined around cam ring 13, by pivot pin 22 and first and second sealing members 18 and 20 respectively.

First control oil chamber 26 is connected to a first passage 29 branching off from a control pressure inlet passage 28 communicating with the main oil gallery. First control oil chamber 26 serves to press cam ring 13 in a direction to decrease cam ring 13 in eccentricity, against the spring force of coil spring 14, due to an oil pressure supplied inside the first control oil chamber 26. In other words, first control oil chamber 26 is structured to exert on cam ring 13 a force in a direction to decrease pump chambers 25 in volume, due to oil discharged from discharge port 24 and received in first control oil chamber 26.

Second control oil chamber 27 is connected to a second passage 30 communicating with communication ports 50 described below of electromagnetic valve 6. Second control oil chamber 27 serves to assist the spring force of coil spring 14 and press the cam ring 13 in the direction to increase cam ring 13 in eccentricity, due to an oil pressure supplied inside the second control oil chamber 27. In other words, second control oil chamber 27 is structured to exert on cam ring 13 a force in a direction to increase pump chambers 25 in volume, due to oil discharged from discharge port 24 and received in second control oil chamber 27.

Electromagnetic valve 6 corresponds to a valve mechanism recited in the claims.

(Configurations of Electromagnetic Valve)

Figure 3:
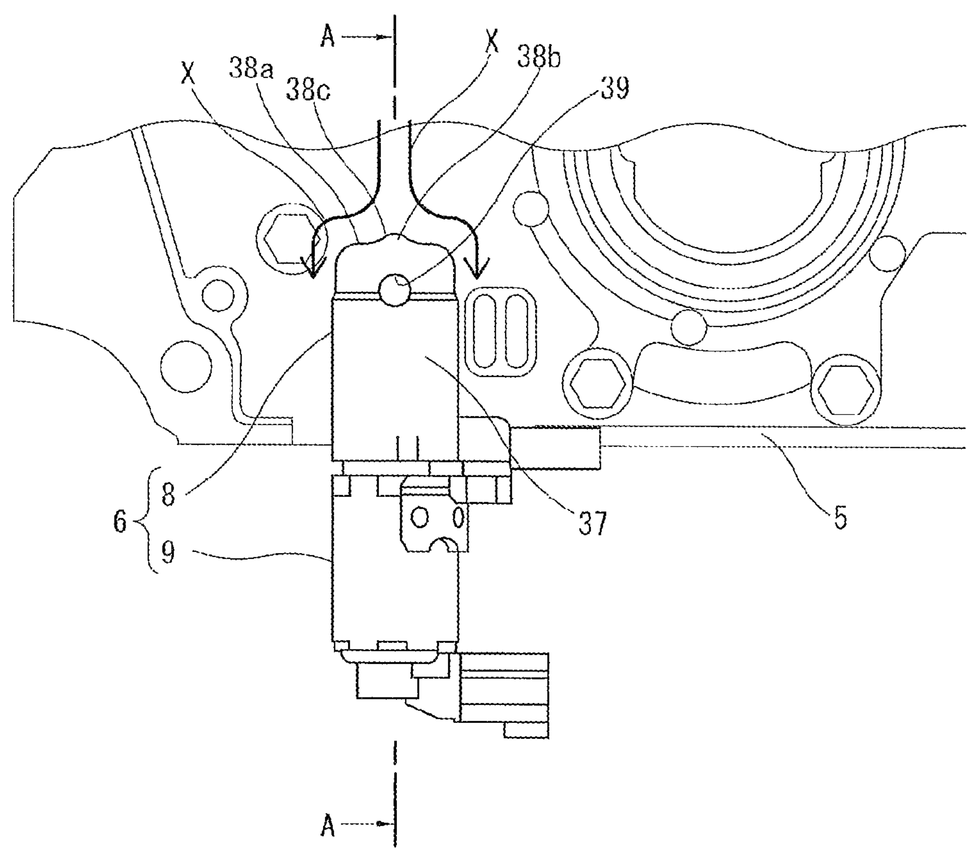
FIG. 3 is a side view of an electromagnetic valve and a tubular part thereof according to the first embodiment, when viewed from a side of a through hole shown in FIG. 1.
Figure 4:
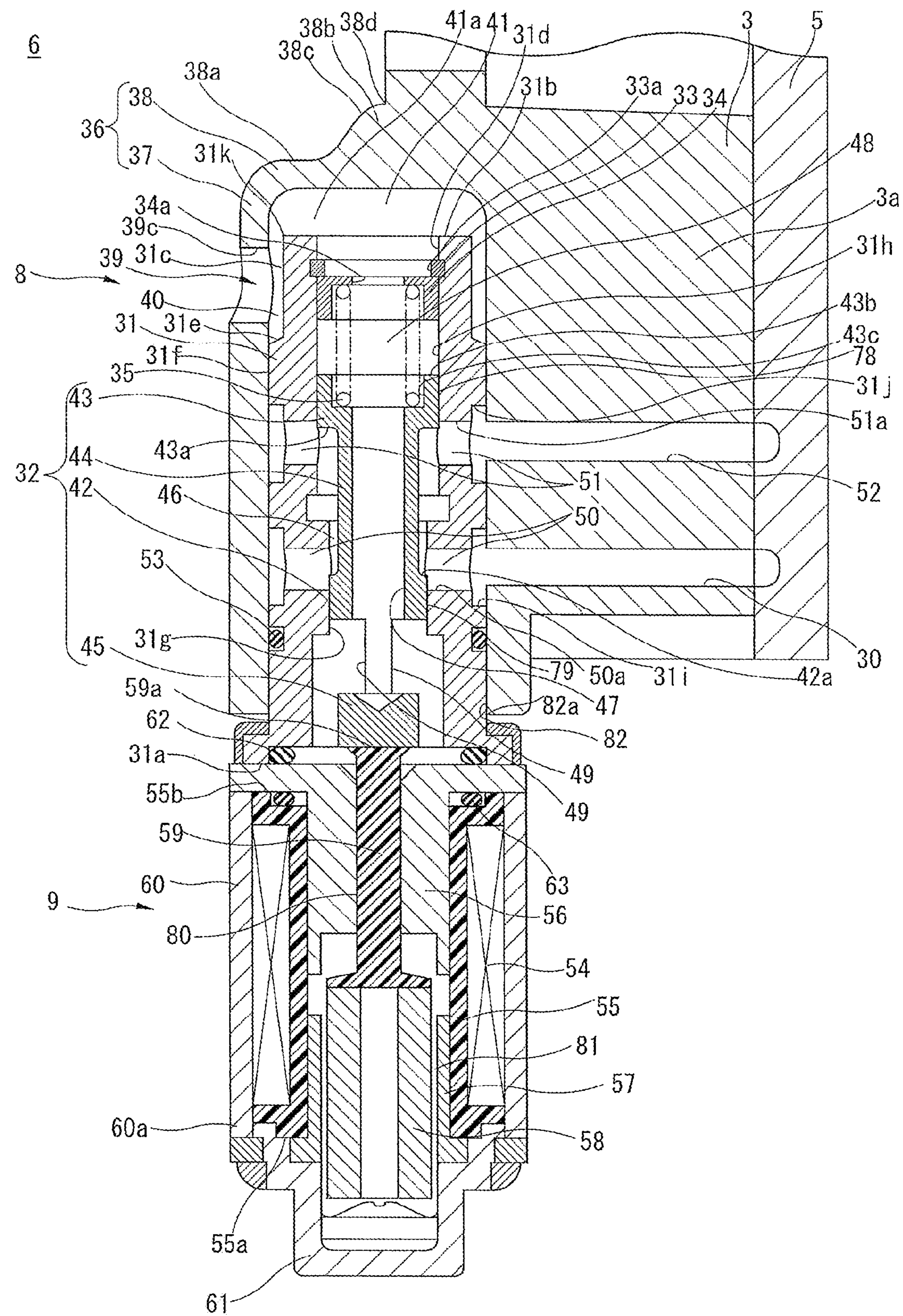
FIG. 4 is a sectional view of the electromagnetic valve and the tubular part along a line A-A shown in FIG. 3.

FIG. 3 is a side view of electromagnetic valve 6 and a tubular part 37 according to the first embodiment, when viewed from a side of through hole 39 shown in FIG. 1. FIG. 4 is a sectional view of electromagnetic valve 6 and tubular part 37 along a line A-A shown in FIG. 3.

As shown in FIGS. 3 and 4, electromagnetic valve 6 includes valve part 8 and solenoid part 9. Valve part 8 serves for supply and discharge of oil depending on the axial position of spool valve 32 (described below) in the direction of movement of spool valve 32. Solenoid part 9 serves to control the axial position of spool valve 32 in response to energization. Electromagnetic valve 6 further includes a valve body 31 disposed in a vertical attitude such that the axial direction being the direction of movement of spool valve 32 coincides with the vertical direction. Accordingly, electromagnetic valve 6 is disposed in the vertical attitude such that valve part 8 is positioned higher in the vertical direction than solenoid part 9, and such that solenoid part 9 is immersed in oil in oil pan 7 (see FIG. 1). Valve body 31 of electromagnetic valve 6 may be disposed in an attitude in which the direction of movement of spool valve 32 is inclined with respect to the vertical direction, depending on a layout inside the internal combustion engine, a mount position of the variable displacement pump, etc.

Valve part 8 includes: valve body 31 having a substantially cylindrical shape; spool valve 32 (i.e. the valve element) slidably contained in valve body 31; a stopper 33 fixed to an inner periphery of valve body 31; a retainer 34 disposed in contact with stopper 33; and a bias member (e.g. a coil spring 35) disposed between retainer 34 and spool valve 32 with a predetermined set load W2 exerted on the bias member.

Valve body 31 is formed in oil pump cover 3, and is contained in a valve container 36 having a shape of bottomed hollow cylinder extending in the vertical direction. Valve container 36 includes tubular part 37 having a substantially cylindrical shape and a bottom part 38 closing a vertically upper end of tubular part 37.

For convenience of explanation, the following description refers to: a longitudinal direction of valve body 31, i.e. the direction of movement of spool valve 32 disposed inside the valve body 31, as "axial direction"; a vertically upper one of both ends of valve body 31 in the direction of movement of spool valve 32 as "axial first end 31*b*" (or a first end, simply); and a vertically lower one of the both ends of valve body 31 in the direction of movement of spool valve 32 as "axial second end 31*a*" (or a second end, simply). Furthermore, "radial direction" represents a direction orthogonal to the axial direction of valve body 31, and "circumferential direction" represents a direction around the axial direction of valve body 31.

Valve body 31 includes a narrow inner diameter part 31*g* formed nearer to axial second end 31*a* and a wide inner diameter part 31*h* formed nearer to axial first end 31*b*. Wide inner diameter part 31*h* is greater in inner diameter than narrow inner diameter part 31*g*. Incidentally, the vertically downward direction corresponds to the gravitational direction, and the vertically upward direction corresponds to the top direction (i.e. the skyward direction) opposite to the gravitational direction.

Valve body 31 includes, in its outer peripheral surface, a first annular groove 31*i* positioned to overlap with narrow inner diameter part 31*g* in the radial direction and formed to extend continuously in the circumferential direction. First annular groove 31*i* is in communication with narrow inner diameter part 31*g* via communication ports 50 that are through ports extending in the radial direction. FIG. 4 shows only two of communication ports 50. First annular groove 31*i* is in communication also with a second passage 30 formed in oil pump cover 3, front cover 5, etc.

Valve body 31 further includes, in its outer peripheral surface, a second annular groove 31*j* positioned to overlap with wide inner diameter part 31*h* in the radial direction and formed to extend continuously in the circumferential direction. Second annular groove 31*j* is in communication with wide inner diameter part 31*h* via supply ports 51 that are through ports extending in the radial direction. FIG. 4 shows only two of supply ports 51. Second annular groove 31*j* is in communication also with a third passage 52 formed in oil pump cover 3, front cover 5, etc.

In valve body 31 configured as described above, spool valve 32 having a shape of bottomed cylinder is disposed to extend in contact with both of narrow inner diameter part 31*g* and wide inner diameter part 31*h* while being slidable in the axial direction. Spool valve 32 includes a first land 42, a second land 43, a connection shaft 44 connecting first land 42 to second land 43, and a shaft 45 connected to first land 42. First land 42 has an annular shape, and is disposed inside of narrow inner diameter part 31*g*. First land 42 has an outer diameter in conformance with an inner diameter of narrow inner diameter part 31*g*. Second land 43 has an annular shape, and is disposed inside of wide inner diameter part 31*h*. Second land 43 has an outer diameter that is in conformance with an inner diameter of wide inner diameter part 31*h* and is greater than the outer diameter of first land 42. First land 42 includes an end face facing toward axial first end 31*b*, wherein this end face is referred to as a first pressure-receiving surface 42*a*. First pressure-receiving surface 42*a* has an annular shape, and is structured to receive a pressure from oil. Second land 43 includes an end face facing toward axial second end 31*a*, wherein this end face is referred to as a second pressure-receiving surface 43*a*. Second pressure-receiving surface 43*a* has an annular shape, and is structured to receive the pressure from oil. First pressure-receiving surface 42*a* is less in area for pressure-receiving than second pressure-receiving surface 43*a*.

Connection shaft 44 has a cylindrical shape, and is less in outer diameter than first land 42 and second land 43. Connection shaft 44 and first land 42 and second land 43 define an annular depression 46 continuing in the circumferential direction. Annular depression 46 has an axial length (i.e. a length between first pressure-receiving surface 42*a* and second pressure-receiving surface 43*a*) which is less than a length between an edge 50*a* and an edge 51*a*, wherein: edge 50*a* is an edge of communication port 50 which faces toward axial second end 31*a*; and edge 51*a* is an edge of supply port 51 which faces toward axial first end 31*b*.

Shaft 45 has a columnar shape, and is less in outer diameter than first land 42 and second land 43.

Spool valve 32 includes, in its inner peripheral side, an axial passage 47 having a circular cross section and extending in the axial direction over first land 42, connection shaft 44, and second land 43. Axial passage 47 is in communication with a back pressure chamber 48 formed between second land 43 and retainer 34.

Shaft 45 includes a pair of grooves 49, 49 that are formed in an outer peripheral surface of shaft 45 adjacently to first land 42 and are in communication with axial passage 47. The pair of grooves 49, 49 are positioned to overlap with each other in the radial direction.

In the following description, "first valve end" of spool valve 32 represents an end facing the axial first end 31*b* of valve body 31, and "second valve end" of spool valve 32 represents an end facing the axial second end 31*a* of valve body 31.

Supply ports 51 are constantly in communication with annular depression 46. On the other hand, communication ports 50 are in communication with annular depression 46 or grooves 49, which is switched depending on the axial position of spool valve 32. In case that supply ports 51 are in communication with communication ports 50 via annular depression 46 (see FIG. 5), oil flows from supply ports 51 to communication ports 50 via annular depression 46. In case that supply ports 51 are in communication with annular depression 46 and communication ports 50 are in communication with grooves 49 (see FIG. 6) due to variation in axial position of spool valve 32, oil flows from communication ports 50 to through hole 39 (described below) serving as a drain hole, via grooves 49 and axial passage 47.

Stopper 33 restricts movement of retainer 34 toward axial first end 31*b*. Stopper 33 having an annular shape includes a hole 33*a* in its center, and is fitted in an annular groove formed in an inner peripheral surface of wide inner diameter part 31*h* closely to axial first end 31*b*.

Retainer 34 has a shape of bottomed cylinder, and includes in its bottom a through hole 34*a* communicating with hole 33*a* of stopper 33. Retainer 34 is disposed nearer to axial second end 31*a* than stopper 33, such that the bottom of retainer 34 is in contact with stopper 33. The bottom of retainer 34 and a bottom of a recess groove 43*c* of second land 43, i.e. the bottom of second land 43 and the first valve end, interpose back pressure chamber 48 therebetween. Back pressure chamber 48 contains coil spring 35 on which predetermined set load W2 is exerted. Coil spring 35 includes a first end being in elastic contact with the bottom of recess groove 43*c* and a second end being in elastic contact with the bottom of retainer 34.

Back pressure chamber 48 is in communication with an aperture 31*d* via through hole 34*a* and hole 33*a*, wherein aperture 31*d* is a circular opening defined by an inner peripheral surface of axial first end 31*b*. Aperture 31*d* is positioned apart from bottom part 38 toward solenoid part 9. Accordingly, bottom part 38 and a section of tubular part 37 adjacent to bottom part 38 define a circular depression 41 that is depressed oppositely to valve body 31 across aperture 31*d* and extends toward through hole 39. Thus, when viewed at a cross section in the axial direction of valve body 31, depression 41 is defined by bottom part 38 and the section of tubular part 37 adjacent to bottom part 38, so as to extend toward through hole 39 and be depressed vertically upward with respect to aperture 31*d* as following a projection 38*b* (described below) projecting vertically upward.

Depression 41 is open toward axial first end 31*b* of valve body 31, i.e. open vertically downward, and establishes communication between through hole 39 and aperture 31*d* in association with a narrow outer diameter part 31*c* (i.e. with a gap 40 described below), wherein aperture 31*d* is circular and is open at axial first end 31*b* of valve body 31. Depression 41 includes a part serving as a circumvention passage 41*a* along which oil that has passed axial passage 47, back pressure chamber 48, and aperture 31*d* is diverted toward through hole 39 described below. Depression 41 including circumvention passage 41*a* has a volume set to avoid impeding an oil flow from aperture 31*d* toward through hole 39 via depression 41. In detail, depression 41 may restrict and impede the oil flow in case of insufficiency in volume, and therefore is set to have a volume sufficient to avoid such restriction.

As shown in FIG. 4, through hole 39 is a through hole serving as a drain hole through which oil in second control oil chamber 27 is discharged via electromagnetic valve 6. Through hole 39 is positioned slightly below axial first end 31*b*, in a left half of tubular part 37 in FIG. 4, i.e. a half farther from front cover 5. Through hole 39 has a circular shape when viewed from an outer circumferential side with respect to tubular part 37, and is formed in tubular part 37 piercingly in the radial direction (i.e. in a horizontal direction). The radial direction mentioned here is same with the radial direction with respect to the direction of movement of spool valve 32. Through hole 39 faces narrow outer diameter part 31*c* across gap 40, wherein narrow outer diameter part 31*c* is formed in an outer periphery of valve body 31 at axial first end 31*b*, and wherein gap 40 has an annular shape extending continuously in the circumferential direction. Narrow outer diameter part 31*c* continuously spreads in the axial direction, from axial first end 31*b* to a position slightly below through hole 39. Through hole 39 serves for discharge to oil pan 7 of oil that has flowed through back pressure chamber 48, aperture 31*d*, circumvention passage 41*a*, and gap 40.

As shown in FIG. 4, right halves of tubular part 37 and bottom part 38 in FIG. 4, i.e. halves nearer to front cover 5, are formed integrally with a relatively thick portion 3*a* of oil pump cover 3.

Bottom part 38 includes, in its left half in FIG. 4 (i.e. a half farther from front cover 5), the projection 38*b* that is a crown-like projection projecting from an outer surface 38*a* of bottom part 38 oppositely to valve body 31. Projection 38*b* is positioned at a substantial center of bottom part 38 so as to overlap with a central line of a hollow region in valve container 36, and is formed integrally with portion 3*a*. Projection 38*b* includes a projection slope 38*c* that continues vertically downwardly from a vertically upward end of bottom part 38 and is exposed to the outside of valve container 36. Projection slope 38*c* is inclined in a curved surface spreading from a tip 38*d* of projection 38*b* toward bottom part 38. In detail, projection slope 38*c* is inclined smoothly and continuously from tip 38*d* toward through hole 39, so as to be connected to horizontal outer surface 38*a* of bottom part 38. Projection slope 38*c* serves to radially outwardly deflect oil that has dropped from a vertically upper side, i.e. from crankshaft 2 (see FIG. 1), and thereby reduce an amount of oil directed toward through hole 39 open at a position lower in the vertical direction than projection 38*b*. In other words, projection slope 38*c* is structured to radially outwardly deflect the dropped oil, and thereby suppress the oil containing a contaminant from intruding into valve container 36 via through hole 39.

Narrow outer diameter part 31*c* is connected to a wide outer diameter part 31*f* via a body slope 31*e* having a conic tapered shape. Wide outer diameter part 31*f* is greater in outer diameter than narrow outer diameter part 31*c*. Body slope 31*e* having the conic tapered shape increases in outer diameter toward axial second end 31*a*, i.e., increases in outer diameter as followed vertically downwardly. Wide outer diameter part 31*f* has an outer diameter in conformance with an inner diameter of tubular part 37.

Axial second end 31*a* is provided with a sealing member 53 having an annular shape and establishing liquid-tight sealing between the outer peripheral surface of valve body 31 and an inner peripheral surface of tubular part 37.

Axial second end 31*a* of valve body 31 faces the second valve end of spool valve 32 in the direction of movement of spool valve 32, and is fixed to solenoid part 9 serving as the drive mechanism. Solenoid part 9 is greater in outer diameter than valve body 31. Solenoid part 9 includes a coil 54, a bobbin 55, a fixed iron core 56, a sleeve 57, a movable iron core 58, a rod 59, a case 60, and a closure member 61.

Case 60 has a cylindrical shape, and contains coil 54, bobbin 55, fixed iron core 56, sleeve 57, movable iron core 58, and rod 59. Case 60 is closed by closure member 61 having a shape of bottomed cylinder.

For convenience of explanation, the following description refers to a longitudinal direction of bobbin 55, which has a substantially cylindrical shape, as "retainer axial direction". The retainer axial direction coincides with the axial direction of valve body 31. Furthermore, "retainer axial first end 55*a*" represents a farther one from valve body 31 out of a pair of ends of bobbin 55 in the retainer axial direction, and "retainer axial second end 55*b*" represents a nearer one to valve body 31 out of the pair of ends.

Coil 54 is wound around bobbin 55 having the substantially cylindrical shape. At retainer axial first end 55*a* of bobbin 55, sleeve 57 having a substantially cylindrical shape is fixed to an inner peripheral surface of bobbin 55 by press-fitting. In an inner peripheral side of bobbin 55, movable iron core 58 is disposed to be movable in the retainer axial direction. At retainer axial second end 55*b* of bobbin 55, fixed iron core 56 having a substantially cylindrical shape is fixed to the inner peripheral surface of bobbin 55 by press-fitting. In an inner peripheral side of fixed iron core 56, rod 59 is disposed. Rod 59 is movable in the retainer axial direction integrally with movable iron core 58, upon movement of movable iron core 58. Rod 59 includes a tip 59*a* structured to bias the shaft 45 of spool valve 32 contained in valve body 31, due to movement of rod 59. Fixed iron core 56 is provided with a sealing member 62 having an annular shape and establishing liquid-tight sealing between fixed iron core 56 and valve body 31. Similarly, liquid-tight sealing between fixed iron core 56 and bobbin 55 is established by a sealing member 63 having an annular shape.

In electromagnetic valve 6 configured as described above, movable iron core 58 is attracted to fixed iron core 56 due to attractive action between movable iron core 58 and fixed iron core 56 which is caused by an electromagnetic force generated in response to energization of coil 54. This attraction causes movable iron core 58 to move toward retainer axial second end 55*b*, and consequently causes rod 59 to bias the shaft 45 of valve body 31 toward axial first end 31*b*.

Spool valve 32 varies in axial position depending on relation among: a bias force F1 exerted on spool valve 32 from rod 59; a hydraulic force F2 calculated by multiplying the oil pressure by a difference between the pressure-receiving areas of first pressure-receiving surface 42*a* and second pressure-receiving surface 43*a*; and a bias force F3 exerted on spool valve 32 from coil spring 35. Specifically, in case that a resultant force F1+F2 of bias force F1 and hydraulic force F2 is greater than bias force F3, spool valve 32 moves toward axial first end 31*b*. In case that resultant force F1+F2 is less than bias force F3, spool valve 32 moves toward axial second end 31*a*. Spool valve 32 performs, depending on the axial direction thereof, switching between communication and shutoff between control pressure inlet passage 28 and second control oil chamber 27 and switching between communication and shutoff between second control oil chamber 27 and oil pan 7.

Figure 5:
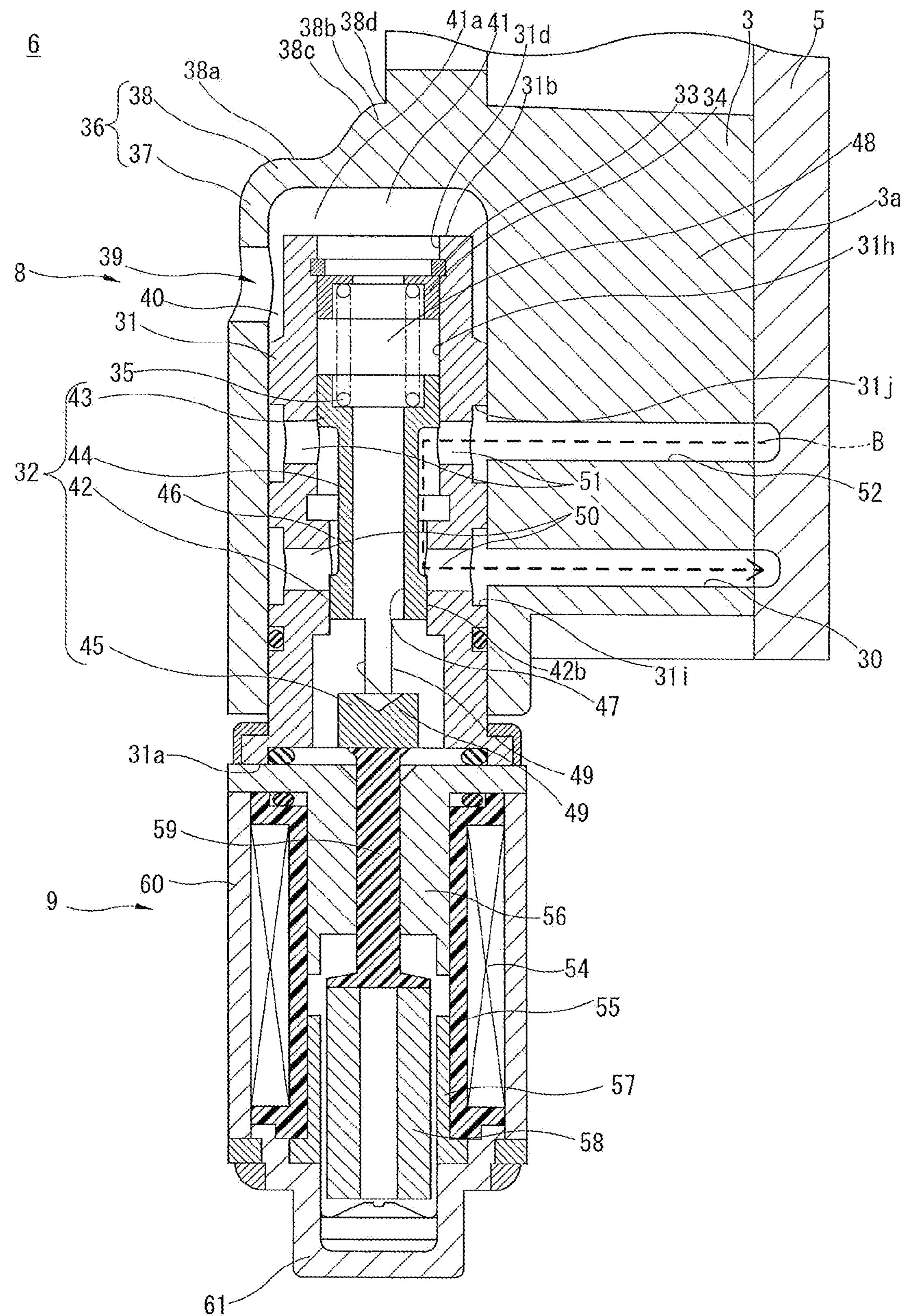
FIG. 5 is a sectional view of the electromagnetic valve according to the first embodiment, which shows a first operational state.

FIG. 5 is a sectional view of electromagnetic valve 6 according to the first embodiment, which shows a first operational state.

In the first operational state, i.e., in case that coil 54 is non-energized and an oil pressure from control pressure inlet passage 28 is supplied to annular depression 46 via third passage 52 and supply ports 51, bias force F1 is zero and hydraulic force F2 is less than bias force F3. This causes spool valve 32 to be biased toward axial second end 31*a* by coil spring 35. Consequently, as shown in FIG. 5, spool valve 32 is at an initial position maximally shifted toward axial second end 31*a*. In this state, supply ports 51 are in communication with communication ports 50 via annular depression 46. This causes oil from control pressure inlet passage 28 to be supplied to second control oil chamber 27 (see FIG. 2) via third passage 52, supply ports 51, annular depression 46, communication ports 50, and second passage 30, as shown by a dashed arrow B in FIG. 5.

Figure 6:
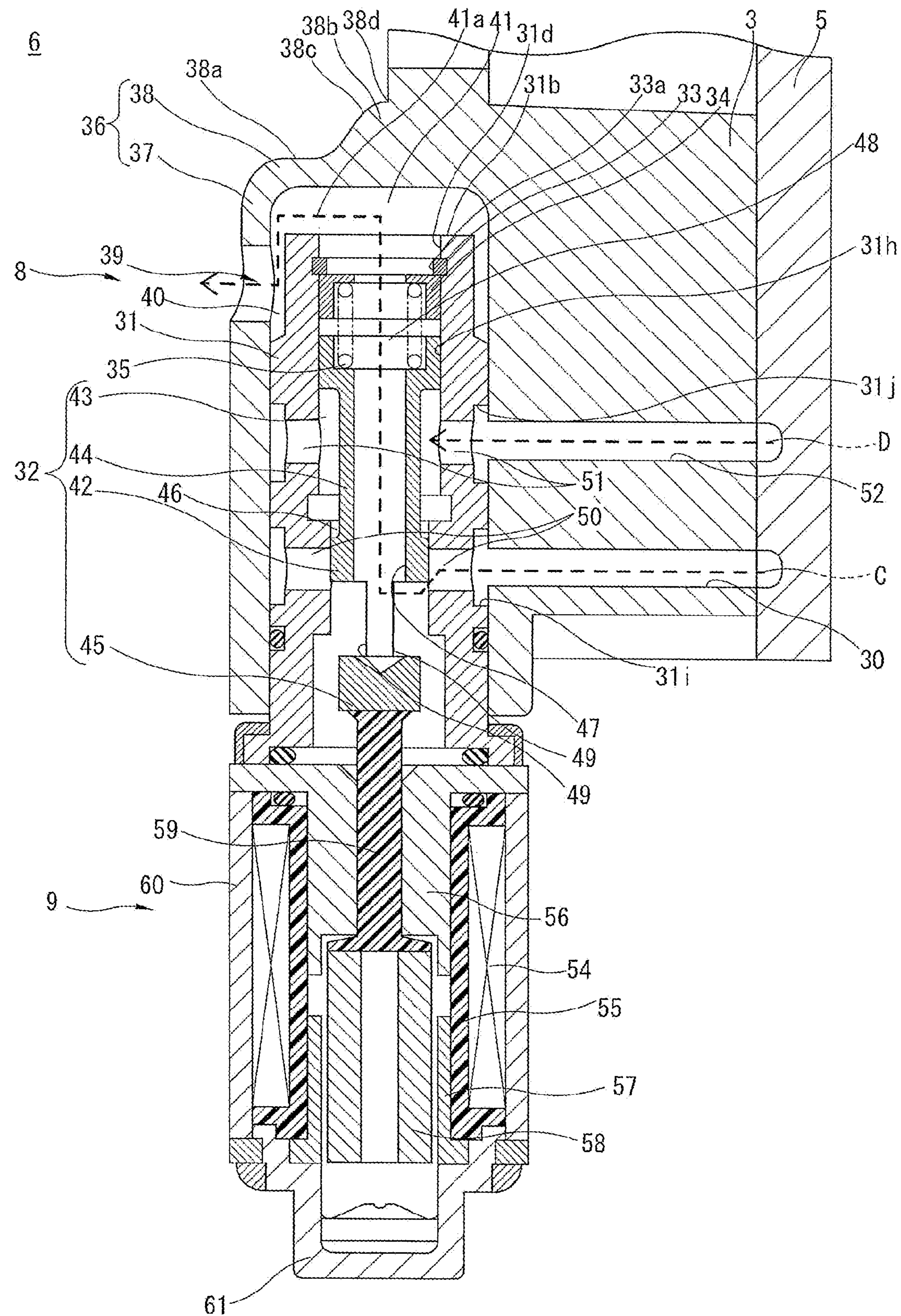
FIG. 6 is a sectional view of the electromagnetic valve according to the first embodiment, which shows a second operational state.

FIG. 6 is a sectional view of electromagnetic valve 6 according to the first embodiment, which shows a second operational state.

In the second operational state, i.e., in case that coil 54 is energized and the oil pressure from control pressure inlet passage 28 is supplied to annular depression 46 via third passage 52 and supply ports 51, resultant force F1+F2 is greater than bias force F3. This causes spool valve 32 to be biased toward axial first end 31*b* due to biasing by the oil pressure and rod 59. Consequently, spool valve 32 is at a position shifted toward axial first end 31*b* in comparison with the initial position (i.e. the position shown in FIG. 5). In this state, second passage 30 is in communication with grooves 49 via first annular groove 31*i* and communication ports 50. This causes oil from second control oil chamber 27 to be discharged to oil pan 7 (see FIG. 1) via second passage 30, first annular groove 31*i*, communication ports 50, grooves 49, axial passage 47, aperture 31*d*, circumvention passage 41*a*, gap 40, and through hole 39, as shown by a dashed arrow C in FIG. 6.

FIG. 6 contains a dashed arrow D to show that annular depression 46 is constantly in communication with third passage 52 via supply ports 51 and second annular groove 31*j*.

Figure 7:
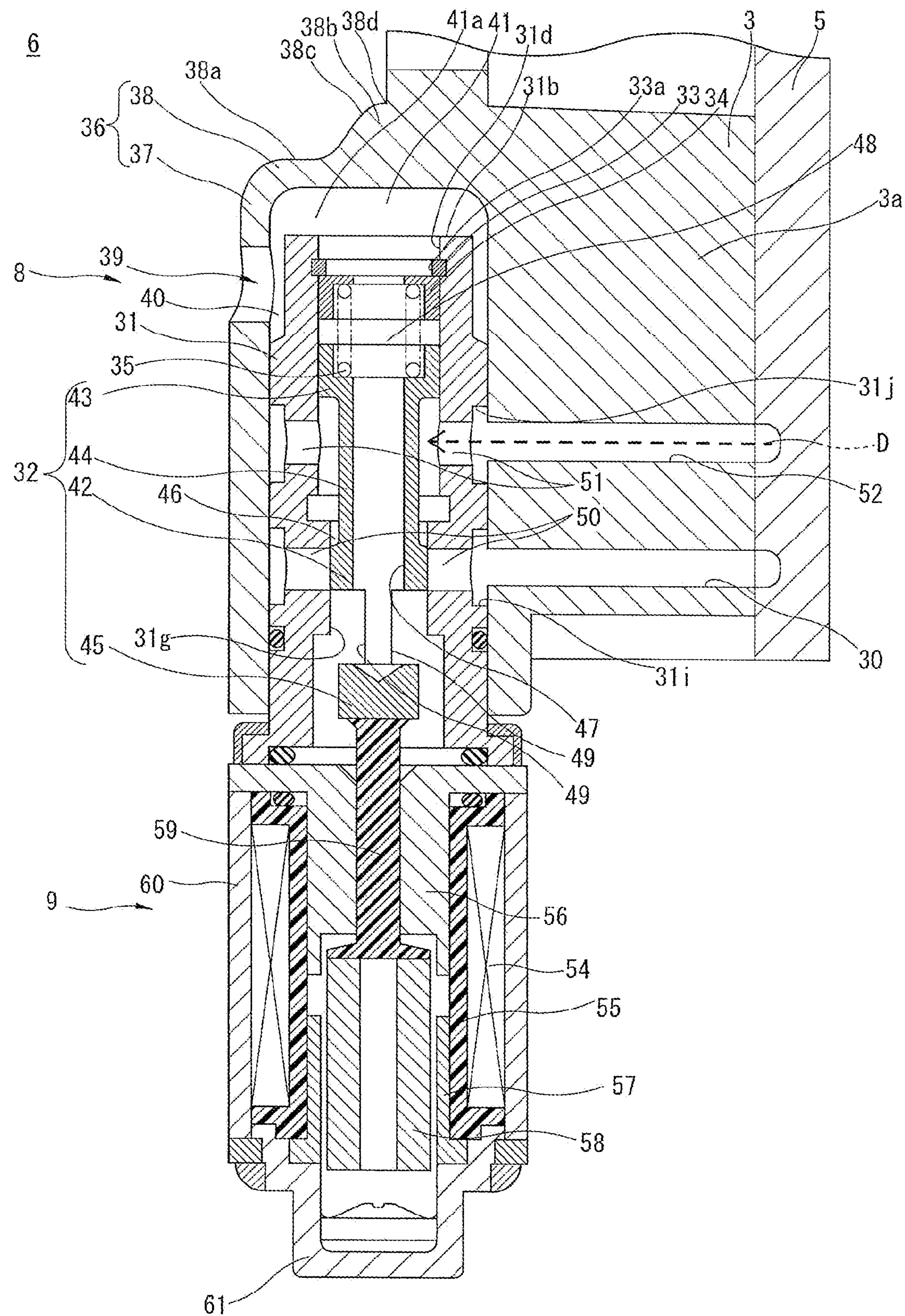
FIG. 7 is a sectional view of the electromagnetic valve according to the first embodiment, which shows a third operational state.

FIG. 7 is a sectional view of electromagnetic valve 6 according to the first embodiment, which shows a third operational state.

In the third operational state, i.e., in case that coil 54 is energized and communication ports 50 are closed by an outer peripheral surface of first land 42, communication between communication ports 50, annular depression 46, and grooves 49 are shut off. This allows neither the switching between communication and shutoff between control pressure inlet passage 28 and second control oil chamber 27 nor the switching between communication and shutoff between second control oil chamber 27 and oil pan 7.

While the present embodiment employs the solenoid as a drive mechanism, this may be replaced with another actuator structured to exert an axial drive force on spool valve 32, such as an actuator structured to generate the drive force by utilizing a discharge oil pressure of the oil pump.

Furthermore, in case that the drive mechanism is structured to generate the drive force not only in one direction but also in the opposite direction, coil spring 35 may be omitted by integrating such drive mechanism with spool valve 32.

While the present embodiment employs the valve mechanism for control on a discharge amount from the variable displacement pump, the valve mechanism may be one for control on a relief amount of oil discharged from the pump. In such case, the pump is not limited to the variable displacement pump, but may be a fixed displacement pump.

While the present embodiment employs the vane pump as a pump structure, this may be replaced with an internal gear pump, such as a trochoid type pump, or an external gear pump.

Figure 8:
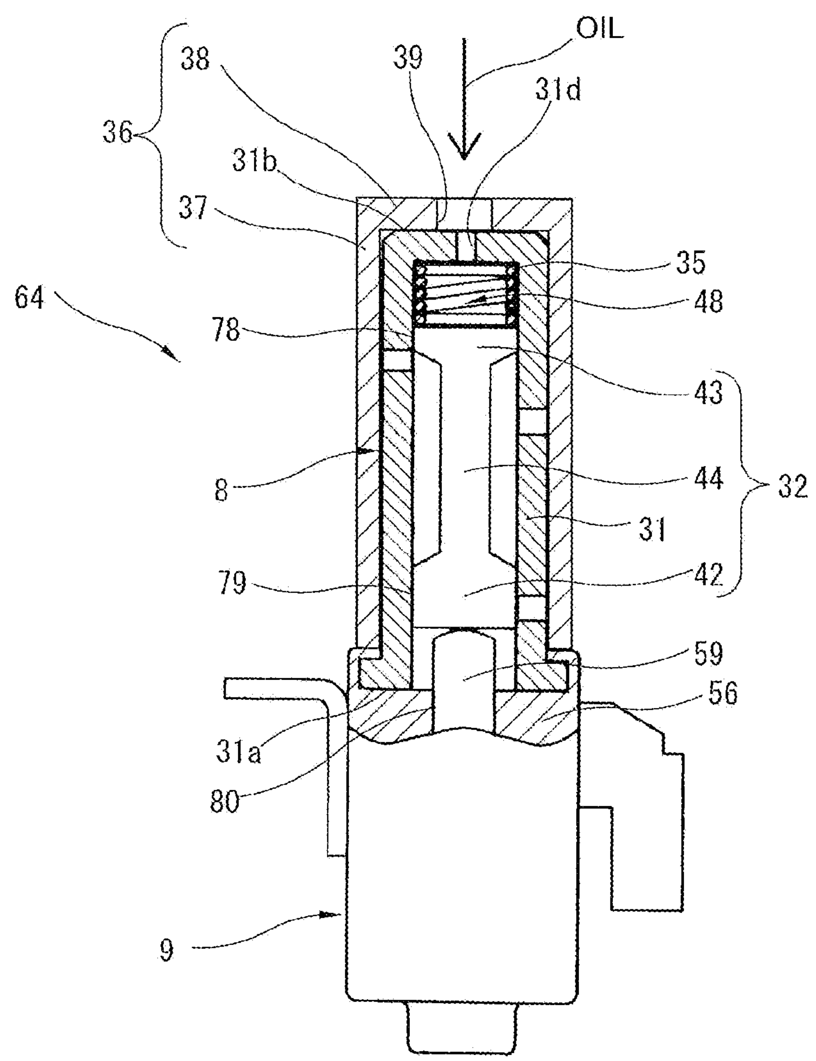
FIG. 8 is a sectional view of an electromagnetic valve according to a conventional art.

[Effects of First Embodiment] FIG. 8 is a sectional view of an electromagnetic valve 64 according to a conventional art. FIG. 8 illustrates a hypothetical case of disposing the electromagnetic valve 64 in a vertical attitude in an oil pan (not shown) such that the axial direction of valve body 31 coincides with the vertical direction.

As shown in FIG. 8, valve body 31 of valve part 8 is contained in valve container 36 having the shape of bottomed cylinder. Valve body 31 includes, in its bottom at axial first end 31*b*, aperture 31*d* being the vertical through hole open vertically upwardly. Valve container 36 includes, in its bottom part 38, through hole 39 being a vertical through hole open vertically upwardly to the atmosphere, wherein through hole 39 is in communication with aperture 31*d*.

Thus-configured electromagnetic valve 64 may undergo a situation in which oil that has dropped from an upper side above electromagnetic valve 64 intrudes into valve body 31 via through hole 39 and aperture 31*d* open vertically upwardly. Furthermore, electromagnetic valve 64 may undergo the oil intrusion into valve body 31 via through hole 39 and aperture 31*d*, also due to oil scattering from an oil surface of oil pan 7 upon vehicle vibration caused by a factor such as an input from the outside. The oil intrusion into valve body 31 via such course may cause spool valve 32 to be fixed due to entering of a contaminant in the oil into gaps 78 and 79 formed between an inner peripheral surface of valve body 31 and outer peripheral surfaces of lands 43 and 42, and may cause electromagnetic valve 64 to undergo a malfunction.

Furthermore, electromagnetic valve 64 according to the conventional art may undergo a situation in which rod 59 is fixed and undergoes a malfunction due to a contaminant that passes through gap 78 or 79 and then enters a gap 80 between an inner peripheral surface of fixed iron core 56 and an outer peripheral surface of rod 59.

On the other hand, according to the first embodiment, aperture 31*d* of valve body 31 is positioned higher in the vertical direction than through hole 39, and is in communication with through hole 39 via circumvention passage 41*a* and gap 40. Aperture 31*d* and through hole 39 are positioned to avoid directly facing each other.

Accordingly, even if oil dropping from an upper side above electromagnetic valve 6 or oil from oil pan 7 intrudes into tubular part 37 via through hole 39, the oil is suppressed from intruding directly into aperture 31*d* beyond narrow outer diameter part 31*c*, wherein aperture 31*d* is positioned higher in the vertical direction than through hole 39. This serves to suppress valve part 8 of electromagnetic valve 6 from undergoing a malfunction, and thereby improve electromagnetic valve 6 in operational stability.

The suppression of the contaminant intrusion into gaps 78 and 79 serves also for reduction of contaminant intrusion into solenoid part 9 and then into gap 80 (see FIG. 4) formed between the inner peripheral surface of fixed iron core 56 and the outer peripheral surface of rod 59 or a gap 81 (see FIG. 4) formed between an inner peripheral surface of sleeve 57 and an outer peripheral surface of movable iron core 58. Accordingly, rod 59 and movable iron core 58 are suppressed from being fixed. This serves to suppress solenoid part 9 of electromagnetic valve 6 from undergoing a malfunction, and thereby improve electromagnetic valve 6 in operational stability.

According to the first embodiment, electromagnetic valve 6 is disposed in the vertical attitude such that aperture 31*d* faces bottom part 38 and is open vertically upwardly. Valve container 36 is depressed vertically upwardly above aperture 31*d*, and is provided with depression 41 forming a part of circumvention passage 41*a*, when viewed at a cross section in the axial direction of valve body 31.

The disposition of electromagnetic valve 6 in the vertical attitude causes through hole 39 to horizontally pierce tubular part 37. This suppresses the oil dropping from above from intruding directly into through hole 39, and thereby serves to improve electromagnetic valve 6 in operational stability.

Depression 41 serves to secure a relatively wide space between bottom part 38 and axial first end 31*b*. This facilitates oil discharge to oil pan 7 via axial passage 47, aperture 31*d*, depression 41, gap 40, and through hole 39.

If depression 41 was not formed, the oil flow from aperture 31*d* to gap 40 via circumvention passage 41*a* would be impeded due to restriction by a narrow space between bottom part 38 and axial first end 31*b*.

In contrast, the first embodiment is configured to discharge oil toward gap 40 and through hole 39 via depression 41 such that the oil is discharged to oil pan 7 while pushing back the oil intrusion into valve body 31 via through hole 39. This serves to suppress a contaminant from intruding into valve part 8 and solenoid part 9 of electromagnetic valve 6, and thereby improve electromagnetic valve 6 in operational stability.

According to the first embodiment, projection 38*b* projecting vertically upwardly is formed in an outer peripheral surface of a vertical top of valve container 36, wherein depression 41 is positioned below projection 38*b* in the vertical direction.

This allows depression 41 to be expanded toward projection 38*b* by appropriately designing a shape and a size of projection 38*b*, and serves to efficiently discharge oil toward gap 40 and through hole 39 with utilization of an expanded passage area in depression 41. This serves to effectively reduce the intrusion of oil containing a contaminant, and thereby improve electromagnetic valve 6 in operational stability.

According to the first embodiment, projection 38*b* includes projection slope 38*c* inclined from tip 38*d* of projection 38*b* toward bottom part 38.

Accordingly, as shown in arrows X in FIG. 3, the oil that has dropped from the upper side above electromagnetic valve 6 hits against projection 38*b* and is deflected radially outwardly. This serves to reduce the amount of oil flowing toward through hole 39. The reduction of the oil amount reduces a contaminant amount contained in the oil. This serves to suppress valve part 8 and solenoid part 9 of electromagnetic valve 6 from undergoing a malfunction, and thereby improve electromagnetic valve 6 in operational stability.

According to the first embodiment, electromagnetic valve 6 is disposed such that the axial direction of valve body 31 coincides with the vertical direction.

Thus, electromagnetic valve 6 is disposed in the vertical attitude. In general, oil pan 7 is designed with a certain amount of margin in a depth direction thereof because oil pan 7 is structured for oil pooling with utilization of a space in the depth direction. Accordingly, it is allowed to reduce the internal combustion engine in dimension in the axial direction of crankshaft 2 while effectively utilizing a dead space in the depth direction in oil pan 7. This serves to reduce the internal combustion engine in size and thereby in manufacturing cost.

According to the first embodiment, solenoid part 9 of electromagnetic valve 6 is positioned lower in the vertical direction than spool valve 32, and is structured to bias the spool valve 32 toward axial first end 31*b* in response to the energization.

This facilitates immersion of solenoid part 9, which is greater in outer diameter than valve body 31, in the oil pool in a lower part of oil pan 7, in comparison with a case that solenoid part 9 is positioned higher in the vertical direction than spool valve 32. This serves to further effectively utilize the dead space in the depth direction in oil pan 7, and thereby efficiently reduce the internal combustion engine in size in the axial direction of crankshaft 2. This serves to reduce the internal combustion engine in size and thereby in manufacturing cost.

According to the first embodiment, through hole 39 is the through hole extending in the radial direction with respect to the movement direction of spool valve 32, and has the circular shape when viewed from the radial direction with respect to the movement direction of spool valve 32.

This facilitates forming of through hole 39 in comparison with a case of forming a through hole in another shape such as a rectangular shape. This serves to improve the variable displacement pump in productivity.

According to the first embodiment, valve body 31 includes in its outer peripheral surface the body slope 31*e* increasing in outer diameter of the outer peripheral surface as followed vertically downwardly.

Body slope 31*e* serves to reduce axial first end 31*b* in radial dimension. This reduces a possibility of interference between an outer peripheral edge 31*k* (see FIG. 4) of axial first end 31*b* and an inner peripheral edge 82*a* of an inlet hole 82 (see FIG. 4), upon insertion of valve body 31 from inlet hole 82 open in an axial second end 31*a* side of tubular part 37. This serves to facilitate the insertion operation of valve body 31 and thereby improve the variable displacement pump in productivity.

According to the first embodiment, the solenoid serving as the drive mechanism is immersed in oil in oil pan 7.

Even in such environment in which the immersion of solenoid part 9 in the oil increases a possibility of the oil intrusion into tubular part 37 via through hole 39, the intrusion of contaminant in oil into aperture 31*d* beyond narrow outer diameter part 31*c* is suppressed due to the positioning of aperture 31*d* vertically higher than through hole 39 as described above. This serves to suppress a contaminant from intruding into valve part 8 and solenoid part 9 of electromagnetic valve 6, and thereby improve electromagnetic valve 6 in operational stability.

According to the first embodiment, spool valve 32 serves as the valve element.

Spool valve 32 includes first land 42 and second land 43, wherein gaps 78 and 79 may be narrowed by appropriately designing outer diameters of first land 42 and second land 43. This serves to suppress a contaminant from intruding into gaps 78 and 79, and thereby improve electromagnetic valve 6 in operational stability.

According to the first embodiment, crankshaft 2 is positioned higher in the vertical direction than valve container 36.

Even in such environment that increases a possibility of oil dropping from crankshaft 2 to valve container 36, the contaminant intrusion into valve container 36 is suppressed due to the above-described positioning of aperture 31*d* vertically higher than through hole 39 and due to the positioning of aperture 31*d* to avoid directly facing the through hole 39. This serves to improve electromagnetic valve 6 in operational stability.

According to the first embodiment, valve container 36 is formed in oil pump cover 3 containing the timing chain.

This eliminates necessity for separately forming a housing for valve container 36. This serves to reduce the oil pump in number of components and thereby in manufacturing cost.

Figure 9:
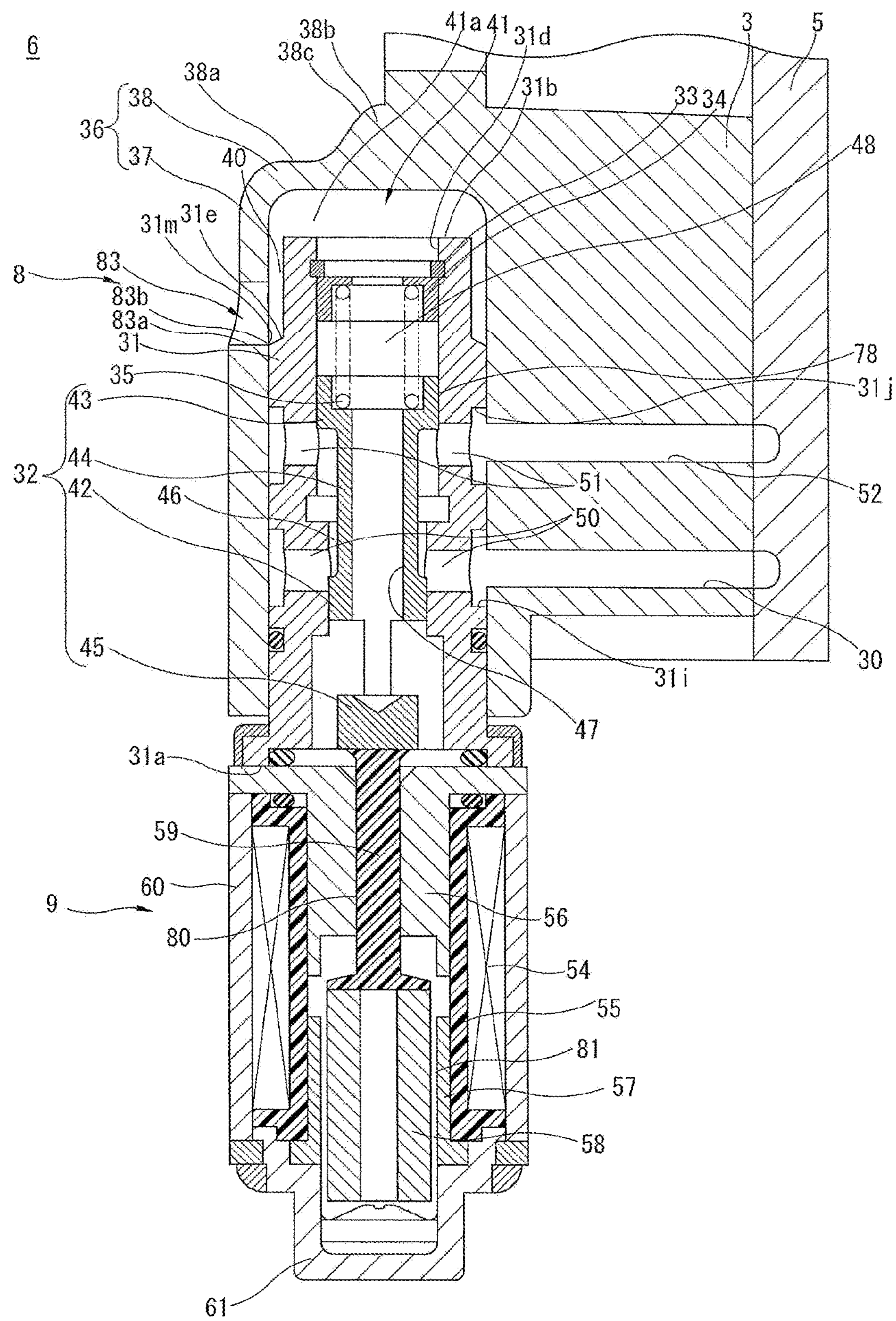
FIG. 9 is a sectional view of an electromagnetic valve according to a second embodiment.

[Second Embodiment] FIG. 9 is a sectional view of electromagnetic valve 6 according to a second embodiment.

A through hole 83 according to the second embodiment is different in position from through hole 39 according to the first embodiment. Specifically, through hole 83 is formed such that body slope 31*e* is positioned within a range of through hole 83, i.e., such that body slope 31*e* overlaps with through hole 83 in the radial direction of valve body 31.

In detail, through hole 83 is formed in tubular part 37, and includes in its axial second end 31*a* side an end 83*a* including an inner edge 83*b* continuous with an end 31*m* of an axial second end 31*a* side of body slope 31*e*. In other words, inner edge 83*b* coincides with end 31*m* in axial position. Consequently, end 83*a* and body slope 31*e* form a continuous surface.

[Effects of Second Embodiment] According to the second embodiment, end 31*m* of the vertically lower side of body slope 31*e* is formed continuously with inner edge 83*b* of the vertically lower side of through hole 83.

Accordingly, even in case of oil intrusion into tubular part 37 via through hole 83, the oil that has intruded flows on the continuous surface formed by body slope 31*e* and end 83*a* and then into oil pan 7. This serves to suppress a contaminant in oil from intruding into valve body 31 via aperture 31*d*, and thereby improve electromagnetic valve 6 in operational stability.

This suppression effect against the oil contaminant intrusion into valve body 31 via aperture 31*d* may be obtained as long as end 31*m* of the vertically lower side of body slope 31*e* is positioned within the range of through hole 83, even in case that end 31*m* of the vertically lower side of body slope 31*e* is discontinuous with inner edge 83*b* of the vertically lower side of through hole 83.

Figure 10:
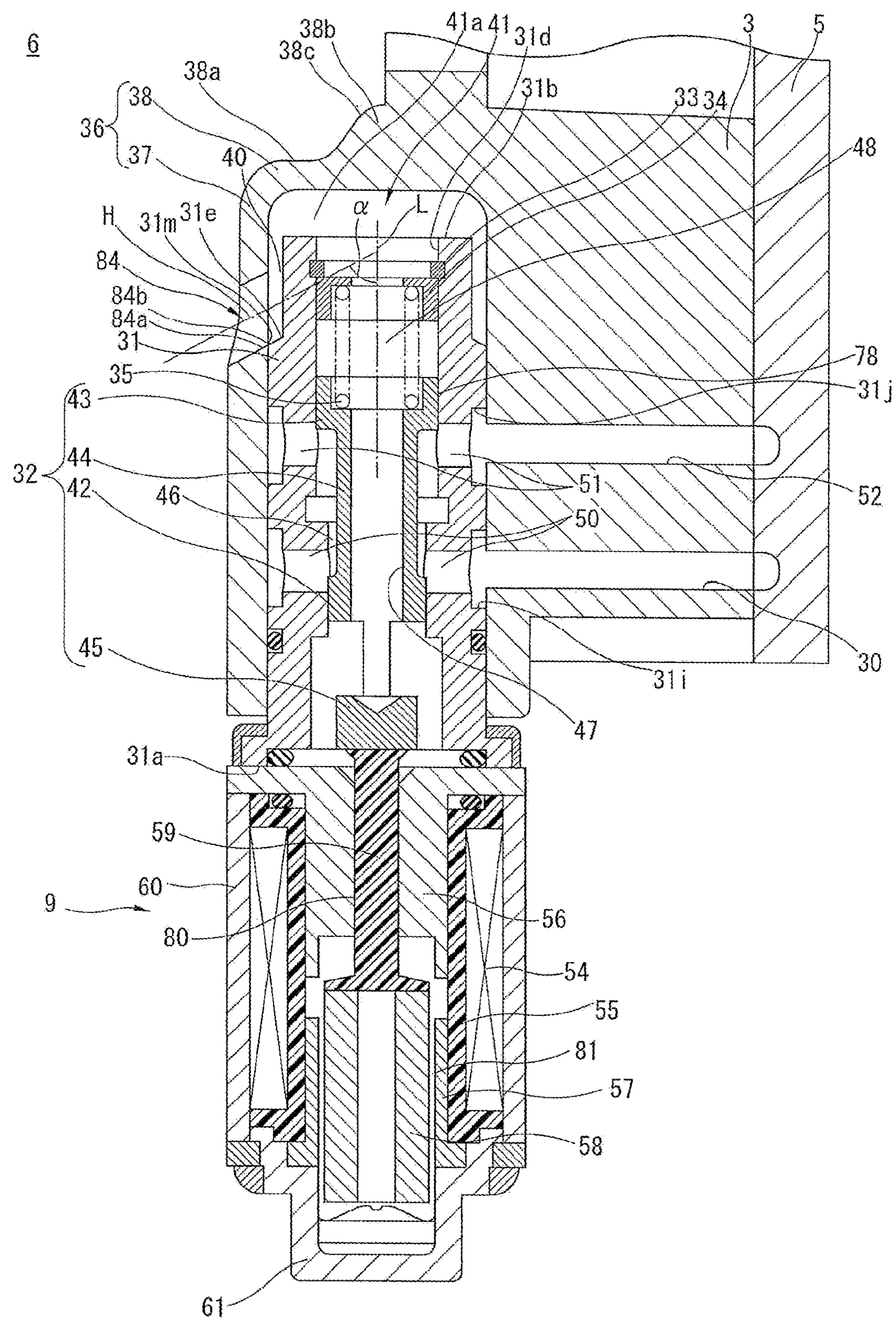
FIG. 10 is a sectional view of an electromagnetic valve according to a third embodiment.

[Third Embodiment] FIG. 10 is a sectional view of electromagnetic valve 6 according to a third embodiment.

A through hole 84 according to the third embodiment is different in piercing direction, from through hole 83 according to the second embodiment. Specifically, through hole 84 includes an outer end that is open vertically downwardly. In detail, through hole 84 is inclined toward axial second end 31*a* such that an axial line L in the axial direction of valve body 31 and a central line H of through hole 84 intersect at an angle α less than 90°.

Similarly to through hole 83 according to the second embodiment, end 31*m* of the vertically lower side of body slope 31*e* is formed continuously with an inner peripheral edge 84*b* of an inclined end 84*a* of an axial second end 31*a* side of through hole 84, wherein body slope 31*e* and inclined end 84*a* that are both inclined form a continuous surface.

[Effects of Third Embodiment] According to the third embodiment, the outer end of through hole 84 is open vertically downwardly.

Figure 11:
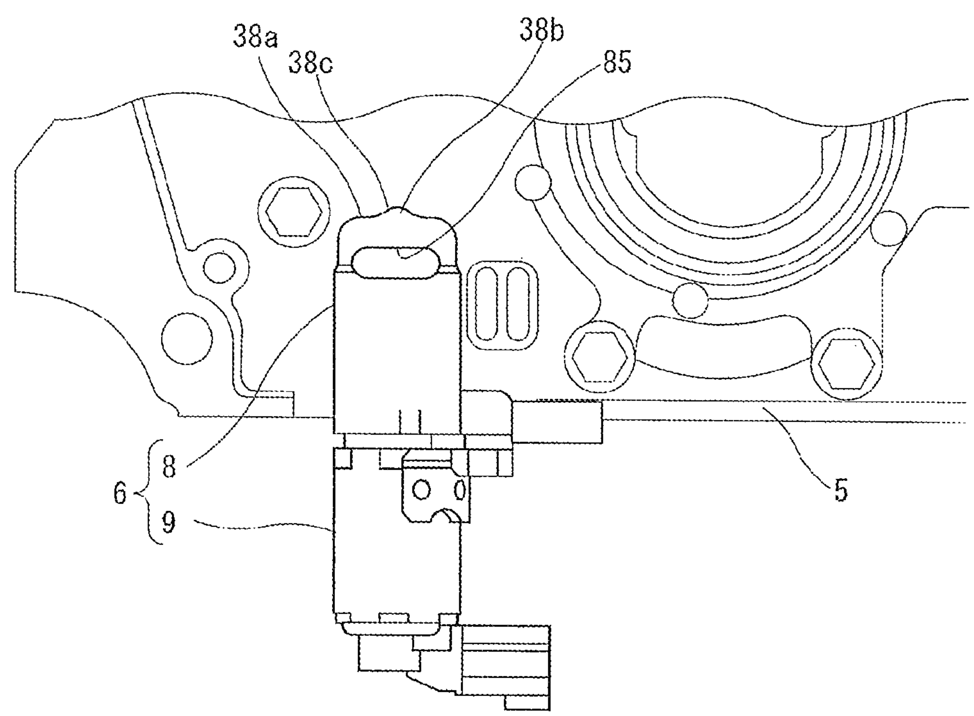
FIG. 11 is a side view of an electromagnetic valve according to a fourth embodiment.

Thus, through hole 84 is inclined obliquely downwardly from the inner peripheral surface to the outer peripheral surface of tubular part 37. Accordingly, even in case of oil intrusion into tubular part 37 via through hole 84, the oil flows smoothly into oil pan 7 along the continuous surface formed by body slope 31*e* and inclined end 84*a*. This serves to suppress a contaminant from intruding into valve body 31 via aperture 31*d*, and thereby improve electromagnetic valve 6 in operational stability,

[Fourth Embodiment] FIG. 11 is a side view of electromagnetic valve 6 according to a fourth embodiment.

Electromagnetic valve 6 according to the fourth embodiment is different in shape of a through hole 85, from any one of electromagnetic valve 6 according to the first, second and third embodiments. Specifically, through hole 85 is longer in opening width in a direction perpendicular to the vertical direction than in the vertical direction, and has a shape of oval longer in the circumferential direction of valve body 31. In other words, through hole 85 has a shape of oval stretched in the circumferential direction around the movement direction of spool valve 32 (see FIG. 4). The oval through hole 85 according to the fourth embodiment is greater in opening area than any one of through holes 39, 83, 84 of the first, second, and third embodiments.

[Effects of Fourth Embodiment] According to the fourth embodiment, through hole 85 has the shape of oval stretched in the circumferential direction around the movement direction of spool valve 32.

The oval shape of through hole 85 serves to increase the through hole 85 in opening area in comparison with a case of a circular through hole. This reduces oil discharge resistance upon the oil discharge to oil pan 7 via axial passage 47, aperture 31*d*, depression 41, gap 40 (see FIG. 4), and through hole 85, and thereby allows the discharged oil to efficiently push back the oil intruding into valve body 31 via through hole 85. This suppresses the oil intrusion into aperture 31*d* via through hole 85, and thereby serves to effectively suppress valve part 8 and solenoid part 9 of electromagnetic valve 6 from undergoing a malfunction and further improve electromagnetic valve 6 in operational stability.

Figure 12:
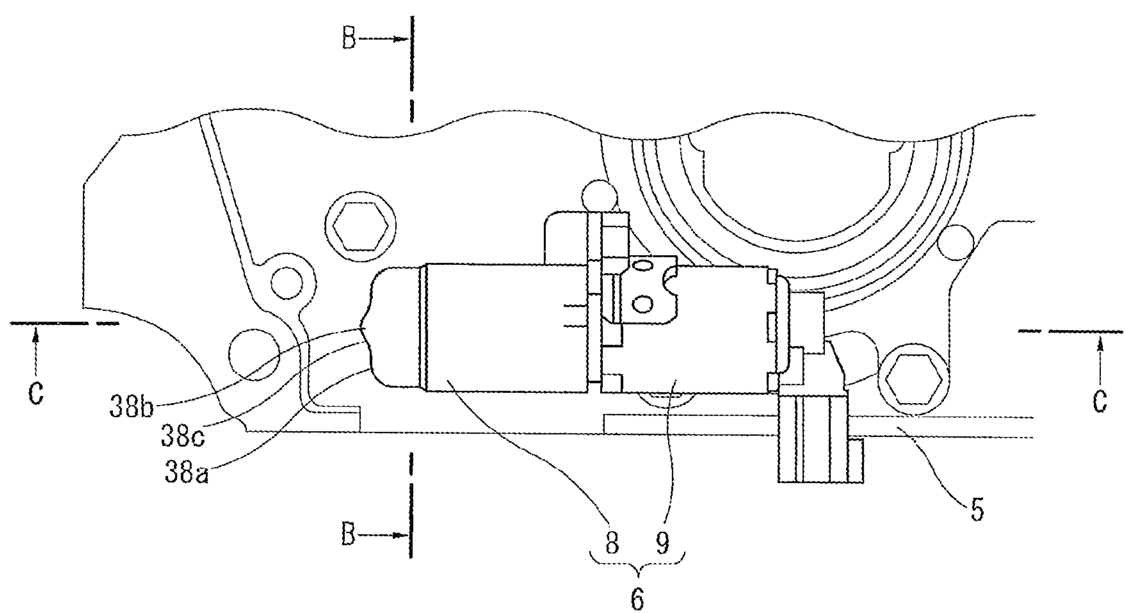
FIG. 12 is a side view of an electromagnetic valve according to a fifth embodiment.
Figure 13B:
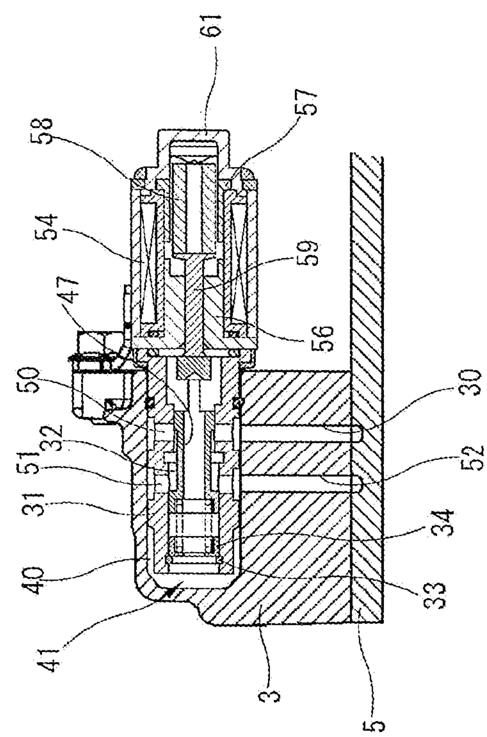
FIG. 13B is a longitudinal sectional view of the electromagnetic valve according to the fifth embodiment, along a line C-C shown in FIG. 12.
Figure 13A:
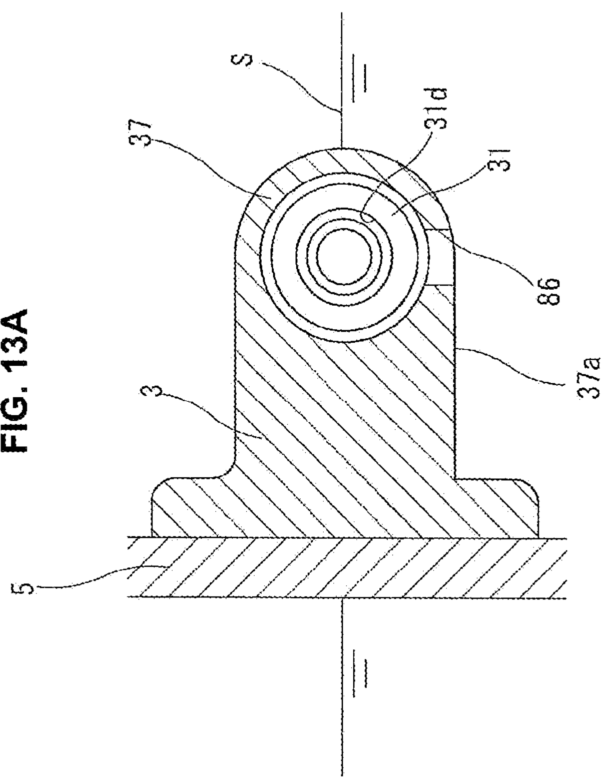
FIG. 13A is a cross sectional view of the electromagnetic valve according to the fifth embodiment, along a line B-B shown in FIG. 12.

[Fifth Embodiment] FIG. 12 is a side view of electromagnetic valve 6 according to a fifth embodiment. FIG. 13A is a cross sectional view of electromagnetic valve 6 according to the fifth embodiment, along a line B-B shown in FIG. 12. FIG. 13B is a longitudinal sectional view of electromagnetic valve 6 according to the fifth embodiment, along a line C-C shown in FIG. 12. FIG. 13A shows a straight line S representing the oil surface of the oil pooled in oil pan 7 (see FIG. 1).

In contrast to electromagnetic valve 6 according to any one of the first, second, and third embodiments, electromagnetic valve 6 according to the fifth embodiment is disposed in a horizontal attitude such that the axial direction of valve body 31, i.e. a longitudinal direction of electromagnetic valve 6, is perpendicular to the vertical direction. Furthermore, electromagnetic valve 6 is disposed to be parallel with front cover 5 and perpendicular to the axial direction of crankshaft 2, i.e. an axial direction of pump component 1 (see FIG. 1).

As shown in FIG. 13A, tubular part 37 according to the fifth embodiment includes, in its vertically lower side, an end 37*a* including a through hole 86 extending in the vertical direction through the end 37*a*. Through hole 86 is open vertically downwardly, and is immersed in the oil below the straight line S representing the oil surface. Furthermore, aperture 31*d* of valve body 31 is positioned higher in the vertical direction than through hole 86.

[Effects of Fifth Embodiment] According to the fifth embodiment, electromagnetic valve 6 is disposed such that the axial direction of valve body 31 is horizontal, i.e. perpendicular to the vertical direction, and is perpendicular to a direction of the rotational axis of pump component 1.

In general, oil pan 7 is designed with a space relatively wide not only in the depth direction thereof but also in a width direction thereof, so as to be sufficient in space for oil pooling. Accordingly, it is allowed to reduce the internal combustion engine in dimension in the axial direction while effectively utilizing a dead space in the width direction in oil pan 7. This serves to reduce the internal combustion engine in size and thereby in manufacturing cost.

Furthermore, according to the fifth embodiment, electromagnetic valve 6 is disposed in the horizontal attitude, with aperture 31*d* positioned higher in the vertical direction than through hole 86. This serves to suppress oil that has intruded into through hole 86, from entering the aperture 31*d* vertically upwardly beyond a wall of valve body 31 facing the through hole 86, even in electromagnetic valve 6 disposed in the horizontal attitude. This serves to improve electromagnetic valve 6 in operational stability. In addition, the disposition of through hole 86 immersed in the oil below the oil surface serves to suppress an oil scatter containing a contaminant from intruding into aperture 31*d*.

Even in case that the movement direction of spool valve 32 does not completely coincide with the horizontal direction, it is allowed to reduce the internal combustion engine in dimension in the axial direction as long as the movement direction of spool valve 32 is inclined with respect to the vertical direction.

Figure 14:
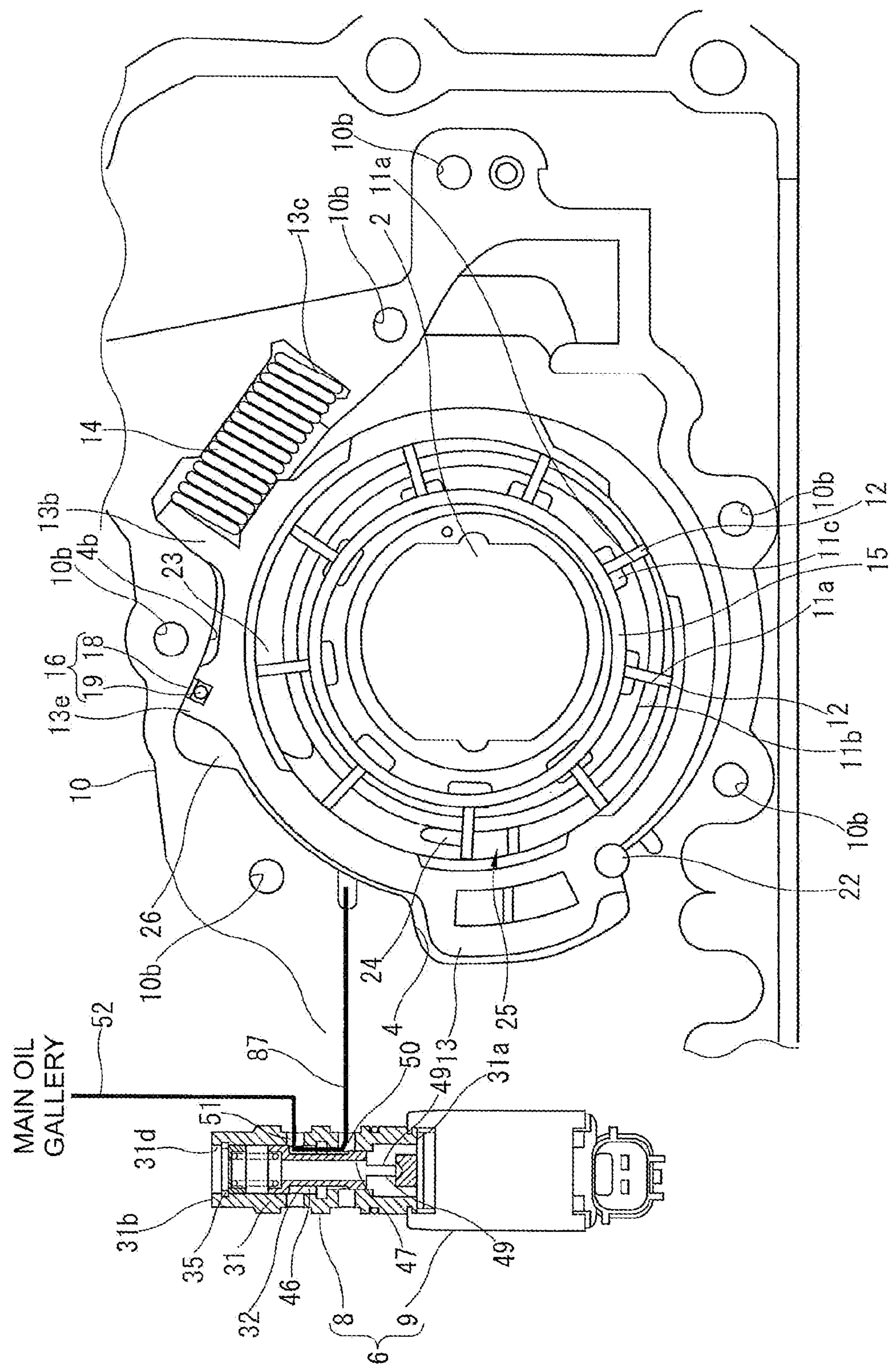
FIG. 14 is a longitudinal sectional view of a variable displacement pump according to a sixth embodiment.

[Sixth Embodiment] FIG. 14 is a longitudinal sectional view of a variable displacement pump according to a sixth embodiment.

According to the sixth embodiment, second sealing mean 17, second seal retainer 13*f*, etc. according to the first embodiment are eliminated, and first control oil chamber 26 is formed alone, wherein first control oil chamber 26 is structured to exert the force on cam ring 13 in the direction to decrease pump chambers 25 in volume due to oil discharged from discharge port 24 and received in first control oil chamber 26. First control oil chamber 26 is connected to communication ports 50 of valve body 31 of electromagnetic valve 6, via a fourth passage 87.

In case that the coil not shown of solenoid part 9 is non-energized and the oil pressure from third passage 52 is supplied to annular depression 46 via supply ports 51, bias force F1 from the rod not shown of solenoid part 9 is zero, and hydraulic force F2 exerted on spool valve 32 is less than bias force F3 from coil spring 35. Consequently, spool valve 32 is biased toward axial second end 31*a* by coil spring 35, and communication ports 50 communicates with supply ports 51 via annular depression 46, as shown in FIG. 14. This causes oil to be supplied from third passage 52 to first control oil chamber 26 via supply ports 51, annular depression 46, and communication ports 50.

In case that the coil not shown of solenoid part 9 is energized and the oil pressure from third passage 52 is supplied to annular depression 46 via supply ports 51, resultant force F1+F2 is greater than bias force F3. Consequently, spool valve 32 is biased toward axial first end 31*b* due to biasing by the oil pressure and the rod, and fourth passage 87 communicates with grooves 49 via communication ports 50. This causes oil to be discharged from first control oil chamber 26 to oil pan 7 (see FIG. 1) via communication ports 50, grooves 49, axial passage 47, aperture 31*d*, and the through hole (see FIG. 4, for example) formed in the valve container not shown.

The variable displacement pump including the first control oil chamber 26 alone as described above may be an application target of the present invention.

While each of the above embodiments exemplifies the variable displacement pump including the cam ring 13 as a control ring, the present invention may be applied to another type of variable displacement pump such as a trochoid type pump. In case of the trochoid type pump, the control ring corresponds to an outer rotor composing an external gear.

While each of the above embodiments exemplifies electromagnetic valve 6 contained in valve container 36 of oil pump cover 3, electromagnetic valve 6 may be contained in, for example, a valve container formed in a pump cover (i.e. a housing) of a variable displacement pump driven by a balancer shaft of a balancer device. In such case, the valve container of the pump cover includes a tubular part, a bottom, and a through hole which are similar to tubular part 37 and bottom part 38 of oil pump cover 3 and through holes 39, 84, 85, and 86.

The following describes exemplary aspects of an oil pump according to the embodiments described above.

An oil pump according to one aspect thereof includes: a pump component structured to suck oil via a suction portion and discharge the sucked oil via a discharge portion; a valve container that includes a hollow part and a through hole establishing communication between an inside and an outside of the valve container, and is disposed between a crankshaft and a bottom of an oil pan; a valve mechanism including: a valve body that is hollow and is disposed in the hollow part of the valve container; a valve element that is movably contained in the valve body and is structured to vary an amount of oil discharged from the pump component, depending on an axial position of the valve element; a back pressure chamber disposed to face a first valve end of the valve element in a direction of movement of the valve element; a drive mechanism that is disposed to face a second valve end of the valve element in the direction of movement of the valve element, and is structured to generate a drive force to move the valve element in the valve body; and an aperture positioned higher in a vertical direction than the through hole and formed in the valve body so as to establish communication between the back pressure chamber and the inside of the valve container; and a circumvention passage establishing communication between the through hole and the aperture.

According to another favorable aspect in addition to the above aspect of the oil pump, the valve element is disposed to move in the vertical direction, with the first valve end directed upwardly in the vertical direction, and the valve container includes a depression that is formed inside the valve container so as to face the aperture and form a part of the circumvention passage.

According to still another favorable aspect in addition to any one of the above aspects of the oil pump, the valve container includes a projection projecting vertically upwardly from an outer surface of a vertical top of the valve container, and the depression is positioned lower in the vertical direction than the projection.

According to still another favorable aspect in addition to any one of the above aspects of the oil pump, the projection includes a surface that continues vertically downwardly from a vertically upper end of the projection.

According to still another favorable aspect in addition to any one of the above aspects of the oil pump, the projection is positioned to overlap with a central line of the hollow part of the valve container.

According to still another favorable aspect in addition to any one of the above aspects of the oil pump, the through hole is open at a position lower in the vertical direction than the projection.

According to still another favorable aspect in addition to any one of the above aspects of the oil pump, the through hole is open downwardly in the vertical direction or open perpendicularly to the vertical direction.

According to still another favorable aspect in addition to any one of the above aspects of the oil pump, the through hole is greater in opening width in a direction perpendicular to the vertical direction than in the vertical direction.

According to still another favorable aspect in addition to any one of the above aspects of the oil pump, the through hole is open in an oval shape.

According to still another favorable aspect in addition to any one of the above aspects of the oil pump, the drive mechanism is a solenoid, and the solenoid is immersed in oil in the oil pan.

According to still another favorable aspect in addition to any one of the above aspects of the oil pump, the crankshaft is positioned higher in the vertical direction than the valve container.

According to still another favorable aspect in addition to any one of the above aspects of the oil pump, the valve container is formed in an oil pump cover containing a timing chain.

According to still another favorable aspect in addition to any one of the above aspects of the oil pump, the valve element is disposed to move in the vertical direction, with the first valve end directed upwardly in the vertical direction. The valve body has a cylindrical shape, and includes an outer periphery including a wide outer diameter part, a narrow outer diameter part, and a slope. The wide outer diameter part is in contact with an inner surface of the valve container. The narrow outer diameter part is less in outer diameter than the wide outer diameter part. The slope is a portion in which the valve body increases in outer diameter from the narrow outer diameter part to the wide outer diameter part. The slope includes a part positioned within a range of the through hole.

According to still another favorable aspect in addition to any one of the above aspects of the oil pump, the valve element is disposed to move in a direction inclined with respect to the vertical direction.

According to still another favorable aspect in addition to any one of the above aspects of the oil pump, the valve element is disposed to move perpendicularly to the vertical direction.

According to still another favorable aspect in addition to any one of the above aspects of the oil pump, the through hole is immersed in oil pooled in the oil pan, below a surface of the oil.

According to still another favorable aspect in addition to any one of the above aspects of the oil pump, the pump component is a variable displacement pump structured to vary in discharge amount by driving a control member, and the valve mechanism is structured to control the driving of the control member.

The following describes an exemplary aspect of a control valve according to the embodiments described above.

A control valve according to one aspect thereof which is structured to control a flow of oil and is disposed between a crankshaft and a bottom of an oil pan includes: a valve container that includes a hollow part and a through hole establishing communication between an inside and an outside of the valve container; a valve mechanism including: a valve body that has a tubular shape and is disposed in the hollow part of the valve container; a valve element that is movably contained in the valve body and is structured to control the flow of oil depending on an axial position of the valve element;

a back pressure chamber disposed to face a first valve end of the valve element in a direction of movement of the valve element; a drive mechanism that is disposed to face a second valve end of the valve element in the direction of movement of the valve element, and is structured to generate a drive force to move the valve element in the valve body; and an aperture positioned to avoid directly facing the through hole and formed in the valve body so as to establish communication between the back pressure chamber and the inside of the valve container; and a circumvention passage establishing communication between the through hole and the aperture.

The invention claimed is:

1. An oil pump comprising:

- a pump component structured to suck oil via a suction portion and discharge the sucked oil via a discharge portion;
- a valve container that includes a hollow part and a through hole establishing communication between an inside and an outside of the valve container, and is disposed between a crankshaft and a bottom of an oil pan;
- a valve mechanism including:
  - a valve body that is hollow and is disposed in the hollow part of the valve container;
  - a valve element that is movably contained in the valve body and is structured to vary an amount of oil discharged from the pump component, depending on an axial position of the valve element;
  - a back pressure chamber disposed to face a first valve end of the valve element in a direction of movement of the valve element;
  - a drive mechanism that is disposed to face a second valve end of the valve element in the direction of movement of the valve element, and is structured to generate a drive force to move the valve element in the valve body; and
  - an aperture positioned higher in a vertical direction than the through hole and formed in the valve body so as to establish communication between the back pressure chamber and the inside of the valve container; and
- a circumvention passage formed outside the valve body and establishing communication between the through hole and the aperture.

2. The oil pump as claimed in claim 1, wherein:

- the valve element is disposed to move in the vertical direction, with the first valve end directed upwardly in the vertical direction; and
- the valve container includes a depression that is formed inside the valve container so as to face the aperture and form a part of the circumvention passage.

3. The oil pump as claimed in claim 2, wherein:

- the valve container includes a projection projecting vertically upwardly from an outer surface of a vertical top of the valve container; and
- the depression is positioned lower in the vertical direction than the projection.

4. The oil pump as claimed in claim 3, wherein the projection includes a surface that continues vertically downwardly from a vertically upper end of the projection.

5. The oil pump as claimed in claim 3, wherein the projection is positioned to overlap with a central line of the hollow part of the valve container.

6. The oil pump as claimed in claim 3, wherein the through hole is open at a position lower in the vertical direction than the projection.

7. The oil pump as claimed in claim 1, wherein the through hole is open downwardly in the vertical direction or open perpendicularly to the vertical direction.

8. The oil pump as claimed in claim 1, wherein the through hole is greater in opening width in a direction perpendicular to the vertical direction than in the vertical direction.

9. The oil pump as claimed in claim 8, wherein the through hole is open in an oval shape.

10. The oil pump as claimed in claim 1, wherein:

- the drive mechanism is a solenoid; and
- the solenoid is immersed in oil in the oil pan.

11. The oil pump as claimed in claim 1, wherein the crankshaft is positioned higher in the vertical direction than the valve container.

12. The oil pump as claimed in claim 11, wherein the valve container is formed in an oil pump cover containing a timing chain.

13. The oil pump as claimed in claim 1, wherein:

- the valve element is disposed to move in the vertical direction, with the first valve end directed upwardly in the vertical direction;
- the valve body has a cylindrical shape, and includes an outer periphery including a wide outer diameter part, a narrow outer diameter part, and a slope;
- the wide outer diameter part is in contact with an inner surface of the valve container;
- the narrow outer diameter part is less in outer diameter than the wide outer diameter part;
- the slope is a portion in which the valve body increases in outer diameter from the narrow outer diameter part to the wide outer diameter part; and
- the slope includes a part positioned within a range of the through hole.

14. The oil pump as claimed in claim 1, wherein the valve element is disposed to move in a direction inclined with respect to the vertical direction.

15. The oil pump as claimed in claim 14, wherein the valve element is disposed to move perpendicularly to the vertical direction.

16. The oil pump as claimed in claim 14, wherein the through hole is immersed in oil pooled in the oil pan, below a surface of the oil.

17. The oil pump as claimed in claim 1, wherein:

the pump component is a variable displacement pump structured to vary in discharge amount by driving a control member; and the valve mechanism is structured to control the driving of the control member.

18. A control valve for controlling a flow of oil, wherein the control valve is disposed between a crankshaft and a bottom of an oil pan, the control valve comprising:

a valve container that includes a hollow part and a through hole establishing communication between an inside and an outside of the valve container;

a valve mechanism including:

a valve body that has a tubular shape and is disposed in the hollow part of the valve container;

a valve element that is movably contained in the valve body and is structured to control the flow of oil depending on an axial position of the valve element;

a back pressure chamber disposed to face a first valve end of the valve element in a direction of movement of the valve element;

a drive mechanism that is disposed to face a second valve end of the valve element in the direction of movement of the valve element, and is structured to generate a drive force to move the valve element in the valve body; and an aperture positioned to avoid directly facing the through hole and formed in the valve body so as to establish communication between the back pressure chamber and the inside of the valve container; and a circumvention passage formed outside the valve body and establishing communication between the through hole and the aperture.

* * * * *